(12) United States Patent
Collinson et al.

(10) Patent No.: US 12,107,856 B2
(45) Date of Patent: *Oct. 1, 2024

(54) SECURE MANAGEMENT AND PROVISIONING OF INTERACTION DATA USING PERMISSIONED DISTRIBUTED LEDGERS

(71) Applicant: The Toronto-Dominion Bank, Toronto (CA)

(72) Inventors: John Michael Collinson, Kitchener (CA); Christopher William Cooney, Toronto (CA); Russell Voutour, Toronto (CA); Marie-Julie Demers, Saint-Lambert (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 142 days.

This patent is subject to a terminal disclaimer.

(21) Appl. No.: 17/853,046

(22) Filed: Jun. 29, 2022

(65) Prior Publication Data

US 2022/0329599 A1  Oct. 13, 2022

Related U.S. Application Data

(63) Continuation of application No. 16/594,472, filed on Oct. 7, 2019, now Pat. No. 11,405,396.

(51) Int. Cl.
| | |
|---|---|
| *H04L 29/06* | (2006.01) |
| *H04L 9/32* | (2006.01) |
| *H04L 9/40* | (2022.01) |
| *H04L 9/00* | (2022.01) |

(52) U.S. Cl.
CPC .............. *H04L 63/10* (2013.01); *H04L 9/321* (2013.01); *H04L 9/50* (2022.05)

(58) Field of Classification Search
CPC ..... H04L 9/3263; H04L 9/3239; H04L 63/10; H04L 63/12; H04L 9/3247; H04L 9/0643
USPC .......................................................... 713/155
See application file for complete search history.

(56) References Cited

U.S. PATENT DOCUMENTS

2019/0020661 A1* 1/2019 Zhang ................. H04L 63/0823

* cited by examiner

*Primary Examiner* — Longbit Chai
(74) *Attorney, Agent, or Firm* — Duane Morris LLP

(57) ABSTRACT

The disclosed exemplary embodiments include computer-implemented systems, apparatuses, and processes that securely track, manage, and provision elements of interaction data within a computing environment in accordance with encrypted permissioning data recorded onto a permissioned distributed ledger. For example, an apparatus may obtain query data that includes an identifier of a computing system and a query term, and access one or more ledger blocks of a permissioned distributed ledger that include encrypted permissioning data and interaction data. The apparatus may decrypt the encrypted permissioning data using a master cryptographic key of a centralized authority. Based on a portion of the decrypted permissioning data associated with the identifier, the apparatus may determine that a portion of the interaction data is associated with the query term and consistent with an access permission of the computing system, and transmit response data to the computing system that includes the portion of the interaction data.

20 Claims, 9 Drawing Sheets

SECURE MANAGEMENT AND PROVISIONING OF INTERACTION DATA USING PERMISSIONED DISTRIBUTED LEDGERS

CROSS-REFERENCE TO RELATED APPLICATION

This application is a continuation of, and claims the benefit of priority to, U.S. application Ser. No. 16/594,472, filed Oct. 7, 2019, the disclosure of which is expressly incorporated herein by reference to its entirety.

TECHNICAL FIELD

The disclosed embodiments generally relate to computer-implemented systems and processes for securely managing and provisioning interaction data within across a computing environment using permissioned distributed ledgers.

BACKGROUND

A customer's relationship with an organization, such as a financial institution or an insurance company, is often be characterized by a time-evolving set of discrete interactions between a device operated by the customer and one or more computing systems operated by the organization. In many instances, the computing systems operated by these organizations monitor and track each of these discrete interactions, and further, generate interaction data characterizing each of the monitored and tracked interaction for storage within corresponding databases or data repositories. Further, a customer-specific decision rendered by a particular organization, e.g., a response to a customer's inquiry, often depends not only on elements of locally maintained interaction data, which characterizes the time-evolving interaction between the customer and the particular organization, but also on additional elements of interaction data maintained by the computing systems operated by other organizations in a marketplace.

SUMMARY

In some examples, an apparatus includes a communications interface, a memory storing instructions, and at least one processor coupled to the communications interface and to the memory. The at least one processor is configured to execute the instructions to obtain query data comprising a first identifier of a first computing system and a query term, and access one or more ledger blocks of a distributed ledger. The one or more ledger blocks include encrypted permissioning data and interaction data. The at least one processor is further configured to decrypt the encrypted permissioning data using a master cryptographic key of a centralized authority and determine that a portion of the decrypted permissioning data is associated with the first identifier. The portion of the decrypted permissioning data characterizes an access permission associated with the first computing system. The at least one processor is also configured to determine that a portion of the interaction data is associated with the query term and consistent with the access permission, and to transmit response data to the first computing system via the communications interface. The response data includes the portion of the interaction data.

In other examples, a computer-implemented method includes obtaining, by at least one processor, query data comprising a first identifier of a first computing system and a query term, and accessing, by the at least one processor, one or more ledger blocks of a distributed ledger. The one or more ledger blocks include encrypted permissioning data and interaction data. The computer-implemented method also includes, by the at least one processor, decrypting the encrypted permissioning data using a master cryptographic key of a centralized authority and determining that a portion of the decrypted permissioning data is associated with the first identifier. The portion of the decrypted permissioning data characterizes an access permission associated with the first computing system. The computer-implemented method includes determining, by the at least one processor, that a portion of the interaction data is associated with the query term and consistent with the access permission, and transmitting, by the at least one processor, response data to the first computing system. The response data includes the portion of the interaction data.

Additionally, in some examples, a tangible, non-transitory computer-readable medium stores instructions that, when executed by at least one processor, cause the at least one processor to perform a method. The method includes obtaining query data comprising a first identifier of a first computing system and a query term, and accessing one or more ledger blocks of a distributed ledger. The one or more ledger blocks include encrypted permissioning data and interaction data. The method also includes decrypting the encrypted permissioning data using a master cryptographic key of a centralized authority and determining that a portion of the decrypted permissioning data is associated with the first identifier. The portion of the decrypted permissioning data characterizes an access permission associated with the first computing system. The method further includes determining that a portion of the interaction data is associated with the query term and consistent with the access permission, and transmitting response data to the first computing system. The response data includes the portion of the interaction data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

Like reference numbers and designations in the various drawings indicate like elements.

DETAILED DESCRIPTION

Figure 1:
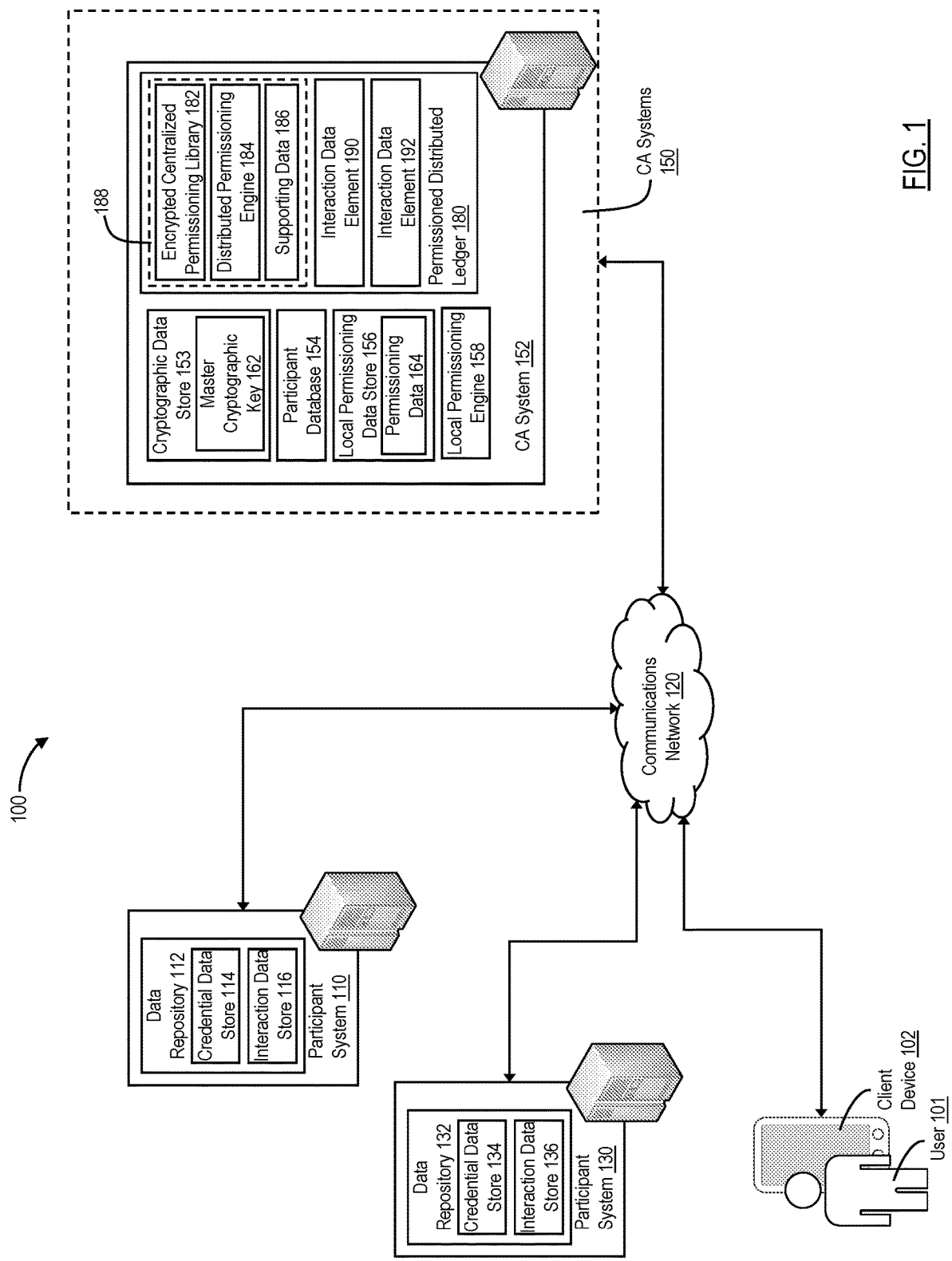
FIG. 1 is a diagram of an exemplary computing environment, consistent with the disclosed embodiments.

This specification relates to computer-implemented processes that, among other things, establish and maintain a permissioned distributed ledger that records encrypted permissioning data associated with a centralized authority and one or more elements of data characterizing an interaction between network-connected devices and systems within a computing environment, and securely track, manage, and provision the elements of interaction data within the computing environment in accordance with the encrypted permissioning data.

As described herein, the computing environment may include one or more network-connected computing systems associated with, or operated by, an entity that participates in an insurance marketplace, e.g., a "participant" system associated with, or operated by, a "participant" in that insurance marketplace. By way of example, one or more of the participants may include an insurance company that insures assets held by corresponding customers (e.g., through an issuance of an insurance policy covering a vehicle owned and operated by a one of the corresponding customers), and that processes and adjudicates insurance claims involving the insured assets and the corresponding customers (e.g., claims to repair damage to the insured vehicle during operation).

In some instances, the issuance of the insurance policies to the corresponding customers, and the processing and adjudication of the claims by the corresponding customers, may be facilitated by a plurality of discrete interactions between the corresponding customers and the insurance company. Examples of these discrete interactions include, but are not limited to, an initial inquiry regarding a quote to insure the asset, an access to or provision of information to facilitate the quote, an underwriting of a specific insurance policy associated with that quote, the submission approval, or payment of a claim, or the transfer of the coverage to a different insurance company.

Further, in other example, the participants in the insurance marketplace may include a business entity supported by or associated with the insurance company, such as a repair shop that repairs an insured asset (e.g., the vehicle) based on a claim processed and approved by the insurance company, and a performance of operations by the associated or supporting business entity may be facilitated by a plurality of additional discrete interactions with not only the corresponding customers, but also with the insurance company. Examples of these additional discrete interactions may include, but are not limited to, a provisioning of a cost estimate for the repairs to the insured asset, a request for and receipt of an approval of the cost estimate from the insurance company, and a receipt of a payment of a claim from the insurance company.

Additionally, or alternatively, the participants in the insurance marketplace may also include a law-enforcement agency capable of issuing citations to an insured assert during operation, or a financial institution or other judicial entity capable of imposing liens or judicial orders on an insured asset (e.g., a lien imposed on the vehicle by the financial institution during repayment of a loan by a corresponding customer). The disclosed embodiments are, however, not limited to these exemplary participants in the insurance marketplace, and in other instances, one or more of the participant systems described herein may be associated with, or may be operated by, any additional or alternate, business, judicial, regulatory, or governmental entity, including multiple ones of the insurance companies and supported or associated business entities described herein, that participate in the insurance marketplace.

In some instances, the participant systems operated by these participants in the insurance marketplace may locally maintain elements of data (e.g., "interaction" data) that identify and characterize the discrete interactions involving corresponding ones of the participants, their customers, and other participants in the insurance marketplace, such as, but not limited to, one or more insurance companies, repair shops, law-enforcement agencies, or other associated or supported entities. Further, and for certain of these discrete interactions, the elements of interaction data locally maintained at corresponding ones of the participant systems may also include additional information identifying or characterizing a determined outcome associated with these discrete interactions, which may be based on both the locally maintained elements of interaction data (e.g., that characterize prior interactions with the customers or the other participants) and additional elements of interaction data maintained at other participant systems within the computing environment.

For example, and as described herein, a participant system operated by an insurance company may receive, from a network-connected device of a customer, a request for quote to insure an asset operated by that customer, such as a customer vehicle. To generate the requested quote (e.g., values of one or more policy parameters of an available insurance policy), the participant system may access the locally maintained elements of interaction data, and obtain information that characterizes one or more prior interactions between the insurance company and the customer (or the customer vehicle), which may include, but are not limited to, information identifying one or more additional policies issued to the customer by the insurance company, or information identifying prior adjudicated claims involving the customer or the customer vehicle.

In other instances, and to characterize further the behavior of the customer or the operation of the customer vehicle, the participant system may also access the elements of interaction data maintained locally by one or more additional participant systems operating within the computing environment, and obtain information that characterizes the interaction between the customer, and the customer vehicle, and the participant in the insurance marketplace associated with each of these additional participant systems. The obtained information may, for example, identify one or more insurance policies issued to the customer by other insurance companies, identify one or more claims adjudicated by the other insurance policies that involve the customer or the customer vehicle, or one or more citations issued by a law-enforcement agency to the customer or the customer vehicle.

As described herein, each of the one or more additional participant systems may maintain the corresponding elements of interaction data within one or more structured or unstructured databases or data repositories. In some instances, however, a format, a composition, or an accessibility of these elements of interaction data may vary between the additional participant systems, e.g., to reflect varying, jurisdiction-specific regulations imposed on the additional participant systems by corresponding governmental, regulatory, or legal entities. As such, the participant system may perform operations that generate, for each of the one or more additional participant systems, a customized request that comports with any imposed jurisdiction-specific regulations, and each of the additional participant systems evaluate the accessibility of the locally maintained interaction data elements to the participant system on a request-by-request basis. Further, and due to variations in the format or composition of the interaction data elements maintained at these additional participant systems, the participant system may also perform operations that modify a structure or a format of the information obtained from these additional participant systems in accordance with a predetermined data structure or format, e.g., established by participant system or the insurance company associated with that participant system.

Further, in some instances, the participant system may perform operations that access each of the additional participant systems, and the elements of interaction data locally maintained by each of the additional participant systems, through a corresponding programmatic interface (e.g., an application programming interface (API)) and based on a successful outcome of one or more authorization or consent protocols (e.g., an OAuth protocol implemented collectively by the participant system and each of the additional participant systems). To facilitate secure communications via these programmatic interfaces, each of the additional participant systems may publish documentation associated with the respective programmatic interface to other network-connected computing systems and devices that operate within the computing environment. In some instances, however, the publication of the documentation within the computing environment may increase a likelihood malicious third-party may attack one or more of the programmatic interfaces and access the locally maintained elements of interaction data without proper authorization of consent (e.g., via an injection attack, a denial-of-service (DoS) attack, etc.).

In some exemplary embodiments, as described herein, one or more computing systems associated with, or operated by, a centralized authority may establish and maintain a cryptographically secure, permissioned distributed ledger that immutably records not only interaction data characterizing discrete interactions between the participants in the insurance marketplace, but also an encrypted set of centralized access permissions associated with the participants, or classes or types of participants, that operate within the insurance marketplace. As described herein, these centralized access permissions may establish an ability of a participant within the insurance marketplace, or a particular type or class of participant within the insurance marketplace, to immutably record elements of interaction data onto the permissioned distributed ledger, or to query the permissioned distributed ledger to access and obtain selected elements of recorded interaction data consistent with a granted access permission. Further, the centralized access permissions may be established and managed by the centralized authority and may be encrypted using a master cryptographic key associated with the centralized authority.

The cryptographically secure, permissioned distributed ledger may also record elements of code that, when executed by the one or more computing systems of the centralized authority (e.g., individually or through consensus-based operations), establish a distributed smart contract facilitating a permissioned access to, and interaction with, the permissioned distributed ledger. By way of example, one or more of the computing systems associated with the centralized authority may receive, via a programmatic interface associated with the distributed smart contract, a request from a participant system to record additional interaction data onto the permissioned distributed ledger and additionally, or alternatively, to access elements of recorded interaction data associated with a customer or an asset.

Upon execution by the one or more computing systems of the centralized authority, the distributed smart contract may access and decrypt the centralized access permissions using the master cryptographic key, determine that a level or type of access requested by the participant system is consistent with a level or type of access specified within the decrypted centralized access permissions, and when the requested level or type of is consistent with that specified within the decrypted centralized access permissions, perform operations consistent with the received request, e.g., individually or on a consensus basis. As described herein, these individual or consensus-based operations may include, but are not limited to: (i) generating an additional ledger block that includes, among other things, the encrypted centralized access permissions and the additional interaction data, and recording the additional ledger block onto the permissioned distributed ledger to generate an updated version of the permissioned distributed ledger; or (ii) querying the ledger blocks of the permissioned distributed ledger to identify elements of interaction data consistent with the query and the level or type of access granted to the participant system, and provisioning the identified elements of interaction data to the participant system.

Certain of the exemplary processes described herein may, among other things, immutably record elements of data characterizing interactions between participants in an enterprise onto a cryptographically secure, permissioned distributed ledger, immutably record encrypted set of centralized access permissions associated with the participants, or classes or types of participants, that operate within the enterprise onto the cryptographically secure distributed ledger, and based on a distributed smart contract executed by one or more computing systems associated with a centralized authority, securely provision access to the immutably recorded elements of interaction data in accordance with the centralized access permissions. In some examples, one or more of these exemplary processes may be implemented in addition to, or as an alternate to, existing processes that request each of the participating systems to broadcast documentation associated with a corresponding programmatic interface to network-connected devices and systems within the computing environment, and to provision access to locally maintained elements of interaction data on a request-by-request basis, e.g., responsive to requests from network-connected devices and system receive through the corresponding programmatic interface.

I. Exemplary Computing Environments and Exemplary Permissioned Distributed Ledgers FIG. 1 is a diagram illustrating an exemplary computing environment 100, consistent with certain disclosed embodiments. For example, as illustrated in FIG. 1A, environment 100 may include one or more computing devices, such as client device 102 operated by user 101. Environment 100 may also include one or more computing systems, such as, but not limited to, one or more participant systems, including participant systems 110 and 130, and one or more computing systems 150 operated by a centralized authority (CA), such as CA system 152.

Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

In some exemplary embodiments, client device 102 may be operated by a corresponding user, such as user 101, and may include a computing device having one or more tangible, non-transitory memories that store data and/or software instructions, and one or more processors configured to execute the software instructions. The one or more tangible, non-transitory memories may, in some aspects, store software applications, application modules, and other elements of code executable by the one or more processors. Client device 102 may also establish and maintain, within the one or more tangible, non-tangible memories, one or more structured or unstructured data repositories or databases that include, among other things, one or more unique network identifiers of client device 102 (e.g., an IP or MAC address assigned to client device 102) and information that identifies, or facilitates a performance of operations, by the one or more executable software applications, application modules, and other code elements.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102, and may do so to cause client device 102 to perform one or more operations consistent with the disclosed embodiments.

Referring back to FIG. 1, each of one or more participant systems (including participant systems 110 and 130) and each of CA systems 150 (including CA system 152) may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. Further, in some examples, each of one or more participant systems (including participant systems 110 and 130) and each of CA systems 150 (including CA system 152) may include a communications unit or interface coupled to the one or more processors for accommodating wired or wireless communication across network 120 with any of the additional network-connected systems or devices described herein, e.g., a transceiver device.

For example, one or more of the participant systems (including participant systems 110 or 130), or one or more of CA systems 150 (including CA system 152), may correspond to a discrete computing system, as described herein. In other examples, one or more of the participant systems (including participant systems 110 or 130), or one or more of CA systems 150 (including CA system 152), may correspond to a distributed system that includes computing components distributed across one or more networks, such as network 120, or other networks, such as those provided or maintained by cloud-service providers (e.g., Google Cloud™, Microsoft Azure™, etc.).

To perform any of the exemplary processes described herein, each of participant systems 110 and 130 may maintain, within the one or more tangible, non-transitory memories, a data repository (e.g., a respective one of data repositories 112 and 132) that includes a credential data store (e.g. a respective one of credential data stores 114 and 134) and an interaction data store (e.g., a respective one of interaction data stores 116 and 136). For example, credential data stores 114 and 134 may maintain elements of data that identify respective ones of participant systems 110 and 130 to CA systems 152, to additional or alternate ones of CA systems 150, and further, to additional or alternate participant system operating within environment 100. By way of example, these elements of data may include, but are not limited to, a unique network or system address (e.g., an Internet Protocol (IP) address, a MAC address, etc.) or a system-specific credential generated by one or more of CA systems 150, such as CA system 152 (e.g., a digital token, a cryptogram, a hash value having a predetermined structure, etc.).

Credential data stores 114 and 134 may also maintain a public and a private cryptographic key pair assigned to respective ones of participant systems 110 and 130. In some examples, the cryptographic key pair associated with each of participant systems 110 and 130 may be generated and provisioned to participant system 110 and 130 by CA system 152 using any of the exemplary processes described herein (e.g., based on a master cryptographic key associated with the centralized authority, etc.).

In some examples, interaction data stores 116 and 136 may include structured or unstructured data records that identify and characterize one or more discrete interactions between the respective ones of the participants associated with participant systems 110 and 130 (e.g., an insurance company, an associated or support business, etc.) and corresponding counterparties operating within the insurance marketplace (e.g., a customer of the insurance company, another insurance company, a repair shop, a law enforcement agency, etc.). In some instances, and for a particular interaction between the participant associated with participant system 110 (and additionally, or alternatively, participant system 130) and a corresponding counterparty, the structured or unstructured data records of interaction data store 116 (and additionally, or alternatively, interaction data store 136) may maintain information that includes, but is not limited to, an identifier of the counterparty (e.g., a counterparty name, a counterparty class or type, etc.), an identifier of a counterparty system or device (e.g., an IP address, etc.), and one or more elements of interaction data that identify and characterize the particular interaction.

For example, participant system 110 may be associated with, or operated by, an insurance company, and the particular interaction may correspond to an inquiry, transmitted from client device 102 to participant system 110, regarding a quote from the insurance company to insure a vehicle owned and operated by user 101. In some instances, the corresponding elements of interaction maintained within interaction data store 116 for the particular interaction may include one or more parameter values characterizing the requested quote (e.g., a requested type or amount of coverage), one or more identifiers of the vehicle (e.g., a vehicle identification number (VIN), a government-issued identifier, such as a tag number, etc.), and other information that supports a provisioning of the quote by the insurance company, such as a driver's license number of user 101 or a name of an additional insurance company that previously insured the vehicle.

Additionally, or alternatively, the particular interaction may correspond to an issuance, by the insurance company to user 101, of an insurance policy that insures the vehicle owned by user 101 in accordance with certain agreed-upon terms or conditions. In some instances, the corresponding elements of interaction maintained within interaction data store 116 for this additional, or alternate, exemplary interaction may include a policy number or other identifier of the policy, data identifying a period of validity of the policy, the one or more identifiers of the now-insured vehicle (e.g., the VIN or the government-issued identifier, etc.), and data that characterizes the policy terms or conditions, such as a type of coverage (e.g., liability, collision, comprehensive, etc.), an amount of coverage, or any addenda or riders.

Further, in other instances, the particular interaction may also correspond to a submission, by user 101, of a claim against the issued insurance policy to repair damage incurred during an operation of the insured vehicle by user 101. The corresponding elements of interaction maintained within interaction data store 116 for this further exemplary interaction may include the policy number or other identifier of the policy, the one or more identifiers of the now-insured vehicle (e.g., the VIN or the government-issued identifier, etc.), data that characterizes the claim against the insurance policy, such as an incident associated with the claim (e.g., vehicle accident, vandalism, etc.) or a time, date, or location of the incident, and additional data characterizing an outcome of the claim adjudication process, e.g., approval or denial. Additionally, in some examples, one or more data records of interaction data store 116 may also maintain, for the further exemplary interaction, additional elements of digital content that support the adjudication of the claim, such as, but not limited to, an electronic copy of a police report or one or more digital images of the damaged vehicle.

The disclosed embodiments are, however, not limited to these exemplary interactions between insurance companies and customers, or to these exemplary elements of interaction data maintained within interaction data store 116 of participant system 110. In other instances, the structured or unstructured data records of interaction data store 116 of participant system 110, and additionally, or alternatively, the structured or unstructured data records of interaction data store 136 of participant system 130 (or data records maintained within interaction data stores by any of the other participant systems in environment 100), may include any additional or alternate elements of interaction data characterizing interactions between the respective ones of the participants associated with participant systems 110 and 130 and corresponding customers, insurance companies, associated or supported business entities, or other participants in the insurance marketplace.

As described herein, the centralized authority may be associated with, or exhibit a relationship with, all or a selected subset of the participants that operate the participant systems within environment 100, including participant systems 110 and 130. For example, these participants may include one or more insurance companies that insure assets held by corresponding customers, and the centralized authority may corresponding to a consortium of these insurance companies that, acting on a consensus basis, impose certain limitations, restrictions, or "best practices" on the operation of these insurance companies within the insurance marketplace. In other examples, the centralized authority may include a regulatory entity, such as an insurance regulator established by a national, provincial, or state government, that regulates the operation of these insurance companies that their interaction with other participants in the insurance marketplace. The disclosed embodiments are, however, not limited to these exemplary centralized authorities, and in other instances, one or more CA systems 150, including CA system 152, may be operated by any additional or alternate governmental entity, regulatory entity, judicial entity, group of participants, or other centralized authority capable of exercising oversight within an enterprise associated with environment 100, such as, but not limited to, the insurance marketplace described herein.

Referring back to FIG. 1, and to perform any of the exemplary processed described herein, CA system 152 may maintain, within the one or more tangible, non-transitory memories, a cryptographic data store 153, a participant database 154, and a local permissioning data store 156, and a local copy of a cryptographically secure, permissioned distributed ledger, e.g., permissioned distributed ledger 180. In some examples, permissioned distributed ledger 180 may include one or more ledger blocks that immutably record not only interaction data characterizing each discrete interaction between the participants in the insurance marketplace, but also an encrypted set of centralized access permissions established by the centralized authority and associated with the participants, or classes or types of participants, that operate within the insurance marketplace. Further, and as described herein, the one or more ledger blocks of permissioned distributed ledger 180 may also record elements of code that, when executed by the one or more processors of CA system 152 (e.g., individually or through consensus-based operations with the other CA systems operating within environment 100), establish a distributed smart contract facilitating a permissioned access to the immutably recorded elements of interaction data by one or more of the participant systems within environment 100, such as participant systems 110 and 130, or one or more of the client devices within environment 100, such as client device 102.

Further, CA system 152 may also maintain within the one or more tangible, non-transitory memories, one or more executable application programs that include, but are not limited to, a local permissioning engine 158. Each additional, or alternate, one of CA systems 150 operating within environment 100 may maintain, within the one or more tangible, non-transitory memories, a corresponding cryptographic data store, participant database, and local permissioning data store, a corresponding local copy of the permissioned distributed ledger, and similar executable application programs, as described herein.

In some instances, cryptographic data store 153 may include one or more cryptographic keys associated with the centralized authority that operates each of CA systems 150 within environment 100, including CA system 152. For example, the one or more cryptographic keys associated with the centralized authority may include a master cryptographic key 162, which may be generated by CA system 152 and provided to each of the additional or alternate CA systems operating within environment 100, e.g., via a secure communications channel across network 120 or through out-of-band communications. In other instances, each of CA systems 150 operating within environment 100 may generate a respective master cryptographic key in accordance with a predetermined key generation algorithm established by the centralized authority (e.g, master cryptographic key 162 generated by CA system 152), and may store the master cryptographic key within a corresponding one of the cryptographic data stores.

By way of example, master cryptographic key 162 for the centralized authority may include a symmetric cryptographic key, and may generated by CA system 152 (and in some instances, by one or more of the additional or alternate CA systems operating environment 100) in accordance with one or more key generation algorithms associated with or specified by the centralized authority. Examples of these key generation algorithms include, but are not limited to, a random number generation algorithm, a pseudorandom number generation algorithm (e.g., using seed data generated through system entropy), or a homomorphic key generation algorithm. Further, in some instances, CA system 152 (and in some instances, by additional or alternate ones of CA systems 150) may perform operations that rotate master cryptographic key 162 and generate, and store within cryptographic data store 153, a replacement master cryptographic key at predetermined intervals, or in response to an occurrence of certain triggering events, such as an implementation of a threshold number of encryption and decryption operations using an existing and valid cryptographic key.

In some examples, CA system 152 may maintain master cryptographic key 162 within a secure portion of cryptographic data store 153 (e.g., a secure partition of the one or more tangible, non-transitory memories, within a software-based container established within the one or more tangible, non-transitory memories) that in inaccessible to any of the participant systems operating within environment 100, such as participant system 110 and 130, or any of the client devices operating within environment 100, such as client device 102. In other instances (not illustrated in FIG. 1A), may maintain master cryptographic key 162 within one or more secure, computing devices in communication with CA system 152 through a corresponding interface, such as a hardware security module (HSM).

Further, although not illustrated in FIG. 1A, cryptographic data store 153 may also include additional, or alternate, elements of cryptographic data associated with CA system 152, one or more of the participant systems operating within environment 100, such as participant systems 110 and 130, or the client devices operating within environment 100, such as client device 102. For instance, cryptographic data store 153 may include private cryptographic key associated with the centralized authority and a corresponding public cryptographic key, which CA system 152 may provision to participant system 110, participant system 130, client device 102, or other network-connected devices and systems within environment 100, e.g., to facilitate asymmetrically encrypted exchanges of data across network 120. Cryptographic data store 153 may also store one or more public cryptographic keys associated participant system 110, participant system 130, client device 102, or the other network-connected devices and systems within environment 100.

Referring back to FIG. 1, participant database 154 may include structured or unstructured data records that identify each of the participant systems operating within environment 100, including participant system 110 and 130, and corresponding ones of the participants associated with these participant systems. By way of example, and as described herein, each of the participant may operate within an insurance marketplace, and examples of these participants include, but are not limited to, an insurance company that insures assets held by corresponding customers, the corresponding customers, a business entity supported by or associated with the insurance company (e.g., a repair shop, etc.), or any additional or alternate judicial, regulatory, governmental entity that monitors or regulates the interactions between the participants in the insurance marketplace.

In some instances, and for a particular one of the participant systems operating within environment 100, the structured or unstructured data records of participant database 154 may main a unique identifier of the particular participant system (e.g., a network address, such as an IP address or a MAC address, etc.), an identifier of the corresponding participant (e.g., a participant name, etc.), and an identifier of a participant class that characterizes the corresponding participant. Examples of these participant classes may include, but are not limited to, a customer, an insurance company, a supported entity, a governmental entity, a legal entity, or a regulatory entity.

Upon execution by the one or more processors of CA system 152, local permissioning engine 158 may perform operations that assign each of the participant systems (and the corresponding participant) to a particular participant class. Executed local permissioning engine 158 may also perform operations that, for each of the participant system and corresponding participants, populate one or more data records of participant database 154 with the unique system identifier, the participant name, and the assigned participant class, e.g., during an initial on-boarding process.

Local permissioning data store 156 may maintain discrete elements of permissioning data 164 that characterize an ability of the participant associated with each of the participant systems within environment 100 to record elements of interaction data onto, or to access certain recorded elements of interaction data within, the ledger blocks of the exemplary, cryptographically secure, permissioned distributed ledger described herein, e.g., permissioned distributed ledger 180 maintained within the one or more tangible, non-transitory memory of CA system 152 (and further, within one or more tangible non-transitory memories of additional or alternate ones of CA systems 150). In some examples, each of CA systems 150, including CA system 152, may represent a node (or "peer" system) within a permissioned distributed-ledger network that establishes, maintains, and updates permissioned distributed ledger 180 using any of the consensus-based processes described herein.

For instance, when executed by the one or more processors of CA system 152, local permissioning engine 158 may perform any of the exemplary processes described herein to generate one or more of the discrete elements of permissioning data 164, and to store each of these discrete elements of permissioning data 164 within a corresponding portion of local permissioning data store 156. By way of example, and as described herein, the participant systems that operate within environment 100, including participant systems 110 and 130, may each be associated with a corresponding participant within an insurance marketplace and a corresponding one of the participant classes described. In some instances, executed local permissioning engine 158 may perform operations that establish the one or more participant classes described herein that characterize the participant systems and the associated participants (e.g., in the insurance marketplace), and generate one or more elements of permissioning data 164 for each of the permissioning classes that includes, but is not limited to, an identifier of the corresponding participant class (e.g., a name, an assigned alphanumeric identifier, etc.) and information that specifies one or more default access or recordation permissions granted to that corresponding participant class by the centralized authority.

By way of example, the default permissions for each of the participant classes (e.g., the exemplary customer, insurance-company, supported-entity, and governmental-, legal-, or regulatory-entity classes described herein) may specify whether participant systems associated with each participant class may request a recordation of one or more elements of interaction data onto permissioned distributed ledger, and additionally, or alternatively, may request access to one or more elements of interaction data immutably recorded onto permissioned distributed ledger 180. In other examples, the default permissions for a particular one of participant classes may limit an ability of a participant system associated with that particular participant class to access certain elements of interaction data immutably recorded onto distributed ledger 180, such as, but not limited to, confidential elements of participant-specific data, confidential elements of customer data, or insensitive elements of participant-specific or customer data recorded immutably onto permissioned distributed ledger 180.

By way of example, and for the insurance-company class of participants, the corresponding element of permissioning data 164 may include an identifier of the insurance-company class (e.g., the class name, the numeric identifier or class code assigned to the insurance-company class by the centralized authority, etc.), along with the information that characterizes the one or more default permissions assigned to the insurance company class, which may include, but are not limited to: (i) a default recordation permission that enables a participant system associated with the insurance-company class to record all interaction data onto distributed ledger 180; and/or (ii) default access permissions that, among other things, enables the participant system associated with the insurance-company class to access all recorded interaction data generated by the participant system, and enables the participant system to access only insensitive elements of recorded interaction data associated with other participant systems and other participants in the insurance marketplace. Examples of these insensitive elements of interaction data may include, but are not limited to, data identifying existence of prior insurance policies issued to a particular customer or asset, data identifying a number or outcome of prior claims involving the particular customer or asset, or elements of publicly available data associated with the particular customer or asset, e.g., an issuance of a citation of an imposition of a lien.

The disclosed embodiments are, however, not limited to these examples of default access or recordation permissions for the insurance-company class, and in other instances, executed local permissioning engine 158 may establish any additional or alternate default access or recordation permission for the insurance-company class. Further, and using any of the exemplary processes described herein, executed local permissioning engine 158 may also establish one or more default access or recordation permission appropriate to each of the additional or alternate classes of participants within the insurance marketplace.

Further, in other examples, executed local permissioning engine 158 may also perform operations that generate additional elements of permissioning data 164 that characterize one or more participant-specific access or recordation permissions that characterize an ability of participant systems associated with a particular participant (e.g., a particular insurance company, a particular repair shop, etc.) to record interaction data onto permissioned distributed ledger 180, or to access elements of interaction data immutably recorded onto permissioned distributed ledger 180. The participant-specific access or recordation permissions (e.g., imposed on the participant systems associated with the particular participant) may, in some instances, be more restrictive than the default access or recordation permissions, or may be more permissive than the default access permissions.

Further, in some instances, executed local permissioning engine 158 may perform the operations that generate additional elements of permissioning data 164 characterizing the one or more participant-specific access or recordation permissions in response to a detected occurrence of one or more triggering events associated with, or involving the particular participant. For example, and without limitation, the one or more triggering events may include a detected instance of an improper use or distribution of the accessed elements of interaction data, and responsive to the detection of the improper use or distribution, executed local permissioning engine 158 generate additional elements of permissioning data that restrict, or eliminate, the ability of those participant systems associated with the particular participant to access the elements of interaction data recorded onto permissioned distributed ledger 180, or to record additional elements of interaction data onto permissioned distributed ledger 180, e.g., on a permanent or temporary basis.

In some instances, executed local permissioning engine 158 may perform operations that access the elements of permissioning data 164 maintained within local permissioning data store 156 (e.g., the one or more default access or recordation permissions assigned to the participant classes, the one or more participant-specific access or recordation permissions, etc.), and encrypt the elements of permissioning data using the master cryptographic key associated with the centralized authority, e.g., master cryptographic key 162, to generate an encrypted centralized permissioning library 182 for the insurance marketplace. For example, encrypted centralized permissioning library 182 may correspond to an initial "snapshot" of the elements of permissioning data 164 maintained within local permissioning data store 156, and may reflect the currently established default and participant-specific access and recordation permissions associated the participants in the insurance marketplace.

In some examples, and to establish permissioned distributed ledger 180, CA system 152 may generate a ledger block that includes encrypted centralized permissioning library 182 and the elements of code, such as software modules or executable scripts, that, when executed by the CA system 152 in conjunction with supporting data, perform operations consistent with the distributed smart contract described herein. For instance, the elements of executable code may include a distributed permissioning engine 184 that, when executed by CA system 152 (e.g., by one or more processors or through an instantiated virtual machine), performs any of the exemplary processes described herein to facilitate access to the permissioned distributed ledger by a participant system (e.g., participant system 110 and 130) in accordance with the default and participant-specific access and recordation permissions maintained within encrypted centralized permissioning library 182.

Further, the generated ledger block may also include data 186 that supports the exemplary processes performed by distributed permissioning engine 184. Examples of supporting data 186 may include, but are not limited to a public cryptographic key or other unique identifier of the distributed smart contract, which may be transmitted (e.g., provisioned) by CA system 152 to each of the participant systems (e.g., participant system 110 and 130) and client devices (e.g., client device 102) operating within environment 100, e.g., through a secure programmatic interface.

CA system 152 may perform, in conjunction with the additional CA systems operating within environment 100, any of the exemplary consensus-based processed described herein to record the generated ledger block onto permissioned distributed ledger 180, e.g., as an initial or genesis block 188 that establishes permissioned distributed ledger 180. In some instances, although not illustrated in FIG. 1, initial or genesis block 188 may also include a digital signature applied to encrypted centralized permissioning library 182, distributed permissioning engine 184, and supporting data 186 by CA system 152 (e.g., using master cryptographic key 162 and any appropriate digital signature algorithm), and further, a hash value representative of encrypted centralized permissioning library 182, distributed permissioning engine 184, supporting data 186, and in some instances, the applied digital signature (e.g., using one or more cryptographic or non-cryptographic hash algorithms).

Further, as illustrated in FIG. 1, distributed ledger 180 may also include one or more additional ledger blocks, e.g., interaction ledger blocks 190 and 192, that immutably record and track elements of interaction data characterizing the discrete interactions between the participants within the insurance marketplace described herein over multiple temporal intervals (e.g., subsequent to the recordation of genesis block 188 onto permissioned distributed ledger 180). Each of the additional ledger blocks, including interaction ledger blocks 190 and 192 may be generated by and recorded onto distributed ledger 180 by CA system 152 and others of CA systems 150 through a collective implementation of any of the exemplary consensus-based processes described herein.

In some instances, one or more of the additional ledger blocks, e.g., interaction ledger blocks 190 and 192, may also include an additional encrypted centralized permissioning library, which reflects a current snapshot of the elements of permissioning data 164 maintained by CA system 152 upon recordation of respective ones of the additional ledger blocks onto permissioned distributed ledger 180, and which also reflects any modifications or additions to permissioning data 164 by executed local permissioning engine 158 prior to the recordation of these additional ledger blocks onto permissioned distributed ledger 180. Each of the additional ledger blocks, including interaction ledger blocks 190 and 192, may also include a digital signature applied to the respective contents of these additional ledger blocks by CA system 152 (e.g., using master cryptographic key 162 and any appropriate digital signature algorithm). Further, each of the additional ledger blocks, a hash value representative of the respective contents of these additional ledger blocks (and in some instances, the applied digital signatures) and further, of the contents of an immediately prior ledger block within the distributed ledger.

II. Exemplary Computer-Implemented Processes for Securely Managing and Provisioning Interaction Data Using Permissioned Distributed Ledgers As described herein, a participant system operating within environment 100, such as participant system 110, may be associated with an insurance company that insures assets held by corresponding customers (e.g., through an issuance of an insurance policy covering a vehicle owned and operated by a one of the corresponding customers), and that processes and adjudicates insurance claims involving the insured assets and the corresponding customers (e.g., claims to repair damage to the insured vehicle during operation). For example, and responsive to acceptance by a customer (e.g., user 101) of a provisioned quote to insure a customer asset (e.g., a vehicle operated by user 101), the insurance company may elect to issue user 101 an insurance policy that insures the vehicle in accordance with certain agreed-upon terms or conditions.

Figure 2A:
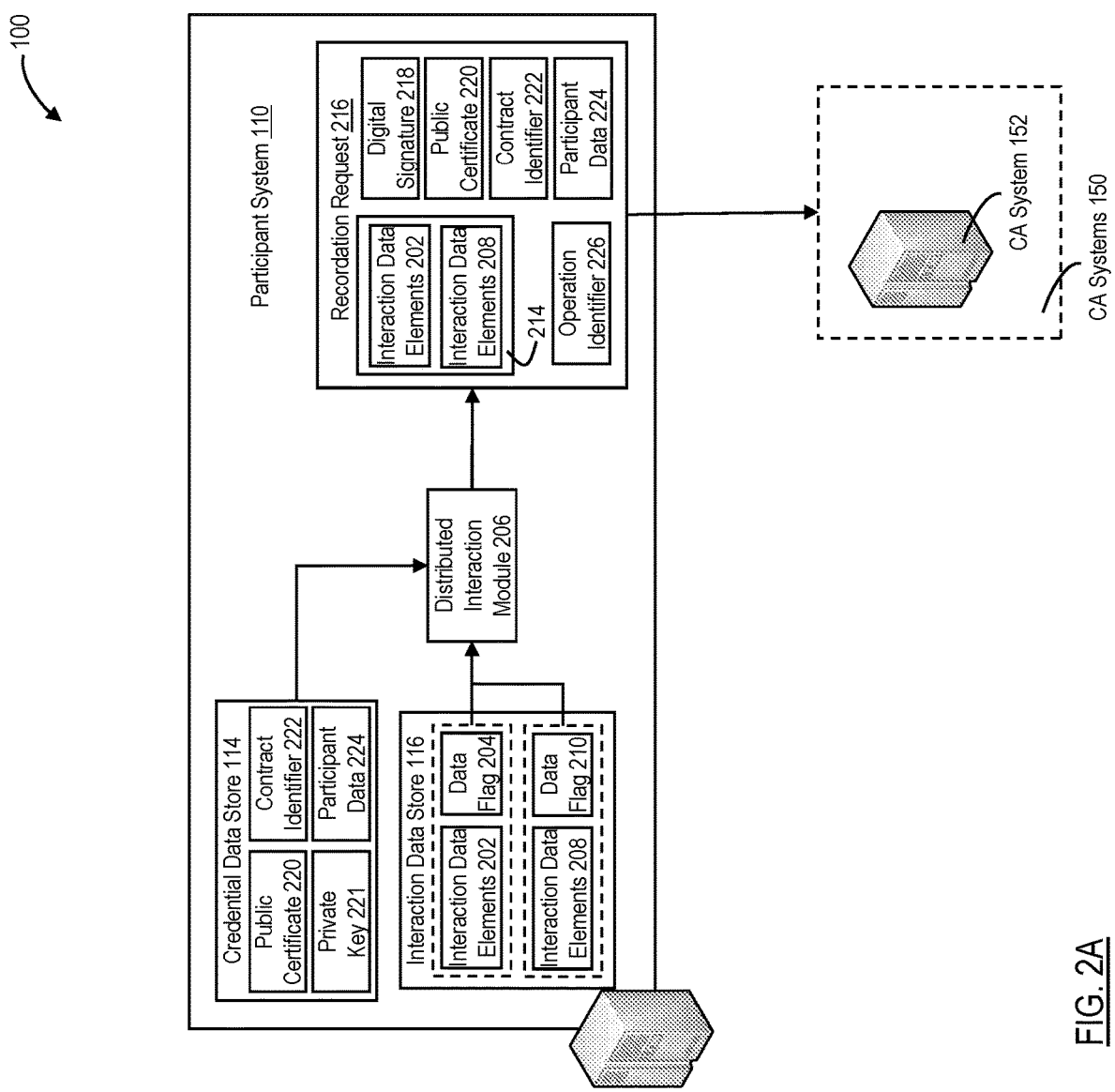
FIGS. 2A-2C and 3A-3C are diagrams illustrating portions of an exemplary computing environment, consistent with the disclosed embodiments.

As illustrated in FIG. 2A, participant system 110 may generate one or more elements of interaction data 202 that characterize and describe the interactions between client device 102 and participant system 110, and further, that identifies and characterizes the issued insurance policy resulting from these interactions. In some instances, participant system 110 may perform operations that store each of the generated elements of interaction data 202 within the one or more tangible, non-transitory memories, e.g., within a corresponding portion of interaction data store 116. For example, the elements of interaction data 202 may include, but are not limited to, one or identifiers of user 101 (e.g., a full legal name of user 101, as set forth within the insurance policy, or a government-issued identifier of user 101, such as a driver's license number, etc.) and contact information associated user 101 (e.g., an address or telephone number of user 101). In other examples, the elements of interaction data 202 may also include information that identifies and characterizes the now-issued insurance policy, such as, but not limited to, a policy number or other identifier of the policy, an effective date and a pendency of the issued policy, one or more identifiers of the now-insured vehicle (e.g., a vehicle identification number (VIN), a government-issued identifier, such as a tag number, etc.), and additional information that that characterizes the now-agreed-upon terms and conditions of the policy. The additional information may, in some instances, identify a type of coverage (e.g., liability, collision, comprehensive, etc.), an amount of coverage, or any addenda or riders associated with the insurance policy.

The disclosed embodiments are, however, not limited to these exemplary elements of interaction data characterizing the interactions between user 101 and the insurance company that resulted in the issuance of the insurance policy, and in other instances, the elements of interaction data 202 may include any additional or alternate information that characterizes user 101, the insured vehicle, the now-issued policy, or the interactions that resulted in the issuance of that policy. Further, the disclosed embodiments are also not limited to exemplary interactions that result in the issuance of the insurance policy to user 101, and in other instances, the elements of interaction data may characterize any additional or alternate interaction between user 101 and the insurance company, or between client device 102 and participant system 110, including those additional interactions described herein.

Further, participant system 110 may also generate and store, within the corresponding portion of interaction data store 116 and in conjunction with the elements of interaction data 202, a data flag 204 having a value indicative of a recordation status of the elements of interaction data 202, e.g., indicative of whether participant system 110 submitted the elements of interaction data 202 for recordation onto permissioned distributed ledger 180. For example, participant system 110 may assign an initial value of zero to data flag 204, which indicates that participant system 110 has not yet submitted these elements of interaction data 202 to CA systems for recordation onto permissioned distributed ledger 180. In other instances, not illustrated in FIG. 2A, participant system 110 may perform any of the exemplary processes described herein to modify the value of data flag 204, e.g., from zero to unity, to reflect the submission of the elements of interaction data 202 to CA systems for recordation onto permissioned distributed ledger 180 and additionally, or alternatively, to reflect a receipt of additional data from one or more of CA systems 150, such as CA system 152, confirming the successful recordation of the elements of interaction data 202 onto permissioned distributed ledger 180.

In some examples, participant system 110 may perform additional operations that, in conjunction with one or more of CA systems 150 (including CA system 152), record all or a portion of the elements of interaction data 202 within an additional ledger block of a permissioned distributed ledger (e.g., permissioned distributed ledger 180 of FIG. 1) in accordance with one or more recordation permissions maintained within a ledger-based centralized permissioning library associated with the centralized authority (e.g., encrypted centralized permissioning library 182 recorded onto permissioned distributed ledger 180). For example, and to initiate the recordation process, a distributed interaction module 206 executed by the one or more processors of participant system 110 may perform operations that detect the generation and storage of the elements of interaction data 202, which characterize the interaction between user 101 and the insurance company and the issuance of the insurance policy involving user 101's vehicle.

Executed distributed interaction module 206 may access interaction data store 116, and may perform operations obtain the elements of interaction data 202 that characterize the interaction between user 101 and the insurance company during issuance of the insurance policy, as described herein. Further, executed distributed interaction module 206 may also parse interaction data store 116 to identify a presence, or an absence, of any additional elements of interaction data not previously submitted to CA systems 150 for recordation onto permissioned distributed ledger 180. By way of example, executed distributed interaction module 206 may identify, within interaction data store 116, one or more additional elements of interaction data 208 associated with a corresponding data flag 210, and may determine that a value of data flag 210, e.g., zero, indicates that the additional elements of interaction data 208 await submission to CA systems 150 and recordation onto permissioned distributed ledger 180.

By way of example, the additional elements of interaction data 208 may identify and characterize one or more prior interactions between the insurance company (e.g., that operates participant system 110) and user 101, other customers, other insurance companies, various supported or associated entities, or any additional or alternate participant in the insurance marketplace. As illustrated in FIG. 2A, and based on the determination, executed distributed interaction module 206 may also perform operations that extract the additional elements of interaction data 208 from interaction data store 116.

Executed distributed interaction module 206 may perform additional operations that package the elements of interaction data 202 and the additional elements of interaction data 208 into a payload 214 of a recordation request 216. Further, in some instances, executed distributed interaction module 206 may perform additional operations that generate and apply a digital signature 218 to payload 214, e.g., using a private cryptographic key 221 of user 101, may package digital signature 218 and a public key certificate 220 associated with participant system 110 (e.g., which include corresponding public cryptographic key of participant system 110) within additional portions of recordation request 216.

Further, in some examples, executed distributed interaction module 206 may also obtain a contract identifier 222 associated with the distributed smart contract within permissioned distributed ledger 180 from credential data store 114, and may package contract identifier 222 within a further portion of recordation request 216. By way of example, contract identifier 222 may include, but is not limited to, a network address associated with distributed permissioning engine 184 (e.g., as recorded onto permissioned distributed ledger 180), a public cryptographic key associated with the centralized authority (e.g., as provisioned to participant system 110 by CA system 152), or any additional or alternate element of data that, upon processing by one or more of CA systems 150, such as CA system 152, triggers an execution of distributed permissioning engine 184 recorded onto permissioned distributed ledger 180.

In addition, executed distributed interaction module 206 may also perform operations that package, into corresponding portions of recordation request 216, participant data 224 that uniquely identifies participant system 110 or the insurance company (e.g., the participant associated with participant system 110). Further, executed distributed interaction module 206 may perform additional operations that generate and package, into corresponding portions of recordation request 216, an operation identifier 226 that identifies an operation associated with recordation request 216, e.g., a recordation operation that, when performed by one of more of CA systems 150, record payload 214 within an additional ledger block of an updated version of permissioned distributed ledger 180. Examples of participant data 224 include, but are not limited to, a name of the insurance company, a participant class that characterizes the insurance company (e.g., the insurance-company class described herein), or a network address of participant system 110 (e.g., an IP or MAC address), and in some instances, executed distributed interaction module 206 may obtain all or a portion of participant data 224 from credential data store 114. Executed distributed interaction module 206 may perform further operations that cause participant system 110 to broadcast recordation request 216 across network 120 to each of CA systems 148, such as, but not limited to, CA system 152, through a secure, programmatic communications channel using any appropriate communications protocol.

Figure 2B:
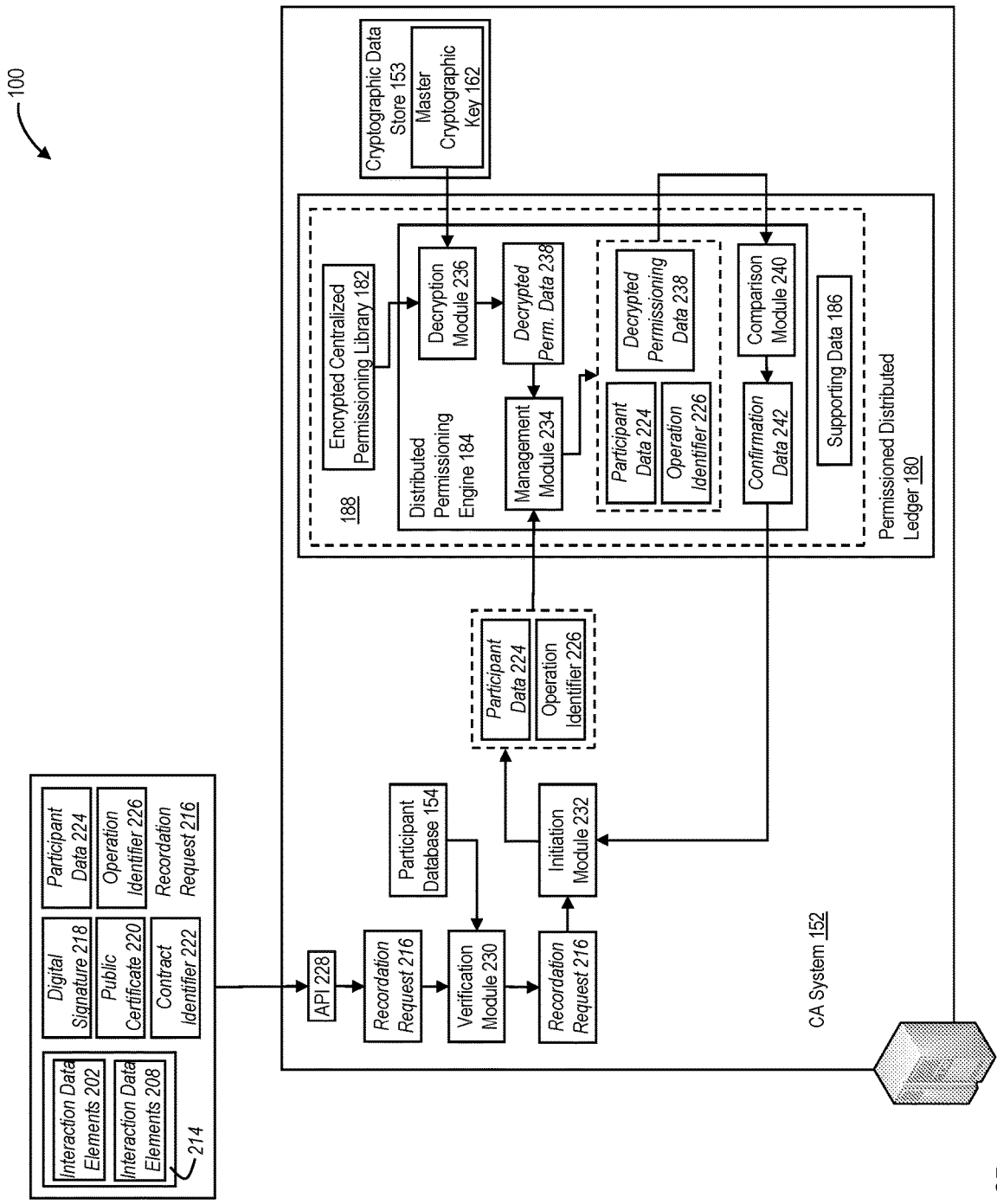

Referring to FIG. 2B, CA system 152 (and each additional or alternate one of CA systems 150) may receive recordation request 216 through a corresponding programmatic interface, such as application programming interface (API) 228, and may route recordation request 216 to a verification module 230. Upon execution by the one of more processors of CA system 152, verification module 228 may perform operations that verify that the participant associated with participant system 110 (e.g., the insurance company) represents one of the participants in the insurance marketplace recognized by the centralized authority (e.g., based on a comparison between the portions of participant data 224 and one or more data records maintained by CA system 152).

If, for example, executed verification module 230 were to determine that the insurance company represents one of the recognized participants (e.g., that the data records of participant database 154 fails to include or reference the participant name or the network address of participant system 110, as included within participant data 224), executed verification module 230 may discard recordation request 216 and generate an error message indicative of the failed verification, which CA system 152 may relay back to participant system 110.

Alternatively, if executed verification module 230 were to determine that the insurance company represents one of the recognized participants (e.g., that the data records of participant database 154 includes or reference the participant name or the network address of participant system 110), executed verification module 230 may perform further operations that verify the digital signature applied to payload 214, e.g., digital signature 218, and as such, verify an integrity of payload 214 and recordation request 216. By way of example, executed verification module 230 may access public key certificate 220 of participant system 110 from recordation request 216, extract the public cryptographic key of participant system 110 from public key certificate 220, and verify digital signature 218 based on the extracted public cryptographic key.

If executed verification module 230 were unable to verify digital signature 218, executed verification module 230 may determine that at least a portion of recordation request 216 became corrupted during transmission from participant system 110. Executed verification module 230 may perform operations that discard recordation request 216, and may generate an error message indicative of the failed verification, which CA system 152 may relay back to participant system 110.

Alternatively, if executed verification module 230 were to successfully verify digital signature 218, executed verification module 230 may perform operations that store recordation request 216 within an accessible portion of the one or more tangible, non-transitory memories, and that provide recordation request 216 as an input to an initiation module 232 of CA system 152. When executed by the one or more processors of CA system 152, initiation module 232 may parse recordation request 216 to detect a presence of contract identifier 222, which identifies the distributed smart contract within the permissioned distributed ledger 180. In response to the detection of contract identifier 222, executed initiation module 232 may perform operations that access ledger block 188 of permissioned distributed ledger 180 (e.g., as maintained within the one or more tangible, non-transitory memories), and that generate one or more programmatic commands that execute distributed permissioning engine 184, which implements the distributed smart contract described herein and facilitates access to permissioned distributed ledger 180 in accordance with the centralized access or recordation permissions maintained within encrypted centralized permissioning library 182.

As illustrated in FIG. 2B, initiation module 232 may extract participant data 224 and operation identifier 226 from recordation request 216, and may provide participant data 224 and operation identifier 226 as an input to a management module 234 of executed distributed permissioning engine 184. In some instances, management module 234 may perform operations that generate one or more programmatic commands that trigger and execution of a decryption module 236 of executed distributed permissioning engine 184. Decryption module 236 may access a master cryptographic key associated with the centralized authority (e.g., master cryptographic key 162 maintained within cryptographic data store 153), and may parse the ledger blocks of permissioned distributed ledger 180 to identify and access a current version of an encrypted set of centralized access or recordation permissions associated with the participants, or classes or types of participants, that operate within the insurance marketplace. In some instances, decryption module 236 may decrypt the current version of the encrypted set of centralized access or recordation permissions using master cryptographic key 162, and may route a decrypted permissioning data 238 that includes a decrypted set of centralized access or recordation permissions back to management module 234.

In one example, decryption module 236 may parse ledger blocks 188, 190, and 192 of permissioned distributed ledger 180, and may establish that encrypted centralized permissioning library 182 (e.g., as recorded within ledger block 188) represents the current version of the encrypted set of centralized access or recordation permissions, and may decrypt encrypted centralized permissioning library 182 using master cryptographic key 162 to generate decrypted permissioning data 238. In other examples, not illustrated in FIG. 2B, decryption module 236 identify an additional encrypted centralized permissioning library within a subsequent one of the ledger blocks of permissioned distributed ledger 180 (e.g., one of ledger blocks 190 or 192 recorded onto permissioned distributed ledger 180 at times at a time subsequent to ledger block 188), and may establish that the additional encrypted centralized permissioning library is the current version of the encrypted set of centralized access or recordation permissions. Decryption module 236 may decrypt the additional encrypted centralized permissioning library using master cryptographic key 162 to generate decrypted permissioning data 238, which may be routed to management module 234.

Referring back to FIG. 2B, management module 234 may receive decrypted permissioning data 238, and may provide participant data 224, operation identifier 226, and decrypted permissioning data 238 as an input to a comparison module 240 of executed distributed permissioning engine 184. In some instances, comparison module 240 may perform operations that determine, based on the centralized access or recordation permissions included within the elements of decrypted permissioning data 238, whether the centralized authority permits the participant identified by participant data 224 (e.g., the insurance company) to perform the requested operation associated with operation identifier 226 (e.g., the recordation of interaction data onto permissioned distributed ledger 180).

As described herein, the centralized access or recordation permissions (e.g., as included within the elements of decrypted permissioning data 238) may include one or more default permissions associated with corresponding classes of participants within the insurance marketplace, e.g., the exemplary customer, insurance company, supported entity, governmental entity, legal entity, or regulatory entity classes described herein. By way of example, these default permissions may enable any participant system associated with the insurance company class to record any element of interaction data onto permissioned distributed ledger 180 (e.g., using any of the exemplary, consensus-based operations described herein), but may prevent a participant within the customer class to record any data onto the distributed ledger. In other examples, these default access permissions may enable a participant system associated with the insurance-company class to access all recorded interaction data generated by that participant system, and while enabling the participant system to access only insensitive elements of recorded interaction data associated with other participant systems and other participants in the insurance marketplace.

In other instances, the centralized access or recordation permissions (e.g., as included within the elements of decrypted permissioning data 238) may also include one or more participant-specific access or recordation permissions that characterize an ability of participant systems associated with a particular participant (e.g., a particular insurance company, a particular repair shop, etc.) to record interaction data onto permissioned distributed ledger 180, or to access elements of interaction data immutably recorded onto permissioned distributed ledger 180. The participant-specific access or recordation permissions (e.g., imposed on the participant systems associated with the particular participant) may, in some instances, be more restrictive than the default access or recordation permissions, or may be more permissive than the default access permissions.

Referring back to FIG. 2B, comparison module 240 may establish that the insurance company and participant system 110 are each associated with the insurance-company class of participants in the insurance marketplace. Further, comparison module 240 may determine that the default permissions specified within decrypted permissioning data 238 grant participant system 110 permission to record all elements of interaction data onto permissioned distributed ledger 280, and that decrypted permissioning data 238 includes no participant-specific permissions (e.g., associated with the insurance company or the network address of participant system 110, as specified within participant data 224) that modify these default permissions.

Based on these determinations, comparison module 240 may generate confirmation data 242 indicative of the permission granted participant system 110 to record the payload 214 (e.g., that includes elements of interaction data 202 and 208) within an additional ledger block of permissioned distributed ledger 180. In other instances, not illustrated in FIG. 2B, if comparison module 240 were to establish that the default permissions specified within decrypted permissioning data 238 do not permit participant system 110 to record any elements of interaction data onto permissioned distributed ledger 280, or that one or more participant-specific permissions restrict a default recordation permission granted participant system 110, comparison module 240 may generate one or more additional elements of confirmation data indicate of the denial of permission for participant system 110 to record the payload 214 within the additional ledger block. In some instances, comparison module 240 may route confirmation data 242 back to executed initiation module 232.

Figure 2C:
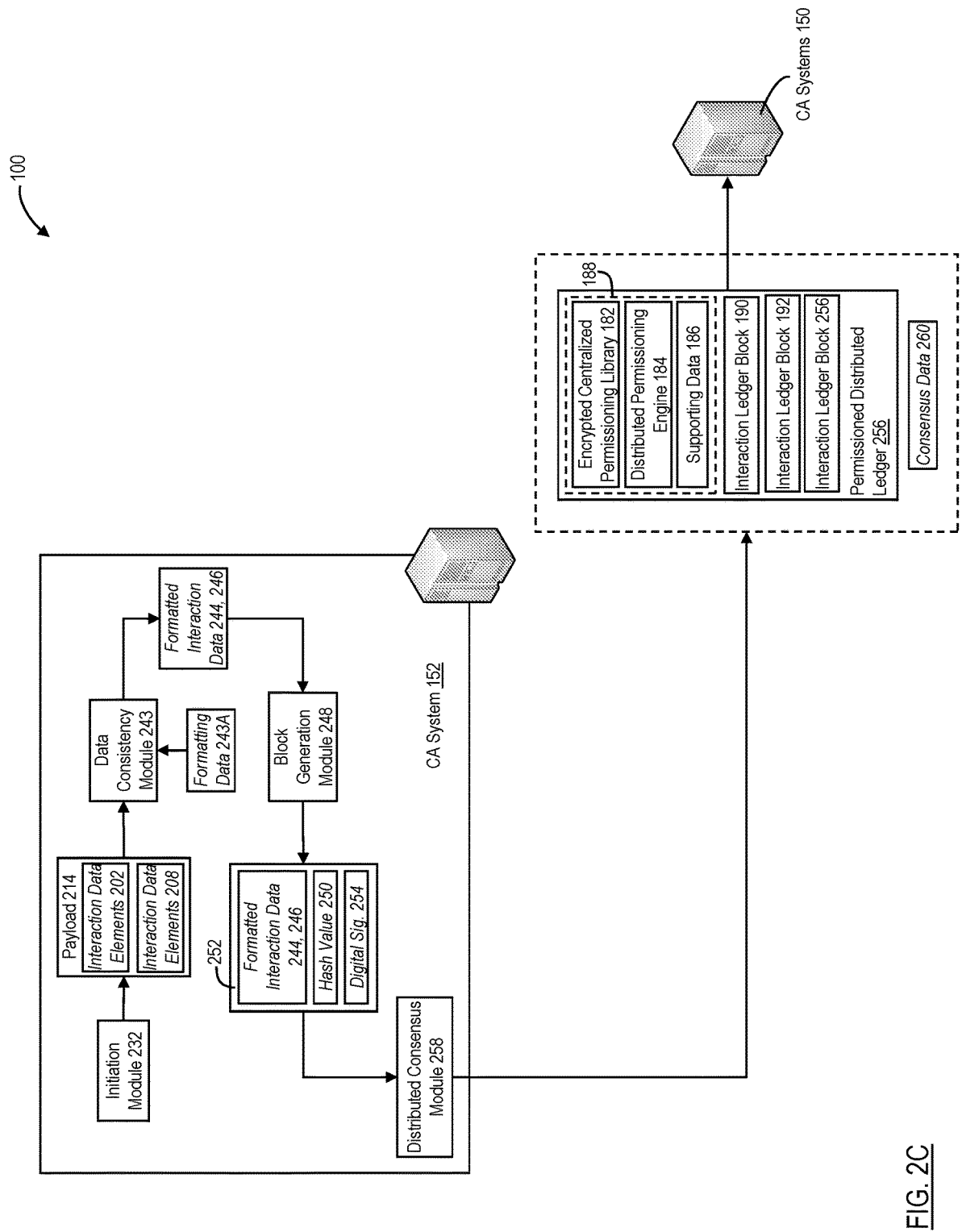

Referring to FIG. 2C, executed initiation module 232 may receive confirmation data 242, may identify the operation associated with confirmation data 242 and operation identifier 226 (e.g., the requested recordation of payload 214), and may perform further processing consistent with that identified operation. For example, executed initiation module 232 may process confirmation data 242 to determine whether the centralized authority permits participant system 110 (and as such, the insurance company associated with participant system 110) to record elements of data, including payload 214, within one or more additional ledger blocks of permissioned distributed ledger 180. If executed initiation module 232 were to determine based on confirmation data 242 that the centralized authority denied participant system 110 permission to record interaction data onto permissioned distributed ledger 180, executed initiation module 232 may discard recordation request 216 and generate an error message, which CA system 152 may relay back to participant system 110 (not illustrated in FIG. 2B).

Alternatively, and based on confirmation data 242, if executed initiation module 232 were to determine that the centralized authority granted participant system 110 permission to record payload 214 within the one or more additional ledger blocks of permissioned distributed ledger 180, executed initiation module 232 may parse recordation request 216 to extract payload 214, and provide payload 214 as an input to a data consistency module 243 of CA system 152. When executed by the one or more processors of CA system 152, data consistency module 243 may receive payload 214, and may perform operations that access one or more elements of formatting data 243A, which identifies and specifies a centralized data format or structure associated with permissioning distributed ledger 180.

Executed data consistency module 243 may perform additional operations that modify a structure or format of all or a portion of the elements of interaction data 202 and/or the elements of interaction data 208 in accordance with the centralized data format or and structure, and that generate elements of formatted interaction data 244 (e.g., that reflect the modified structure or format of the elements of interaction data 202) and elements of formatted interaction data 246 (e.g., that reflect the modified structure or format of the elements of interaction data 208). In some instances, by modifying the structure or format of the elements of interaction data 202 and 208, certain of the exemplary processed described herein enable CA systems 150, including CA system 152, to record elements of interaction data having a common, centralized format and structure identifiable and accessible to not only CA systems 150, but also each of the participant systems operating within environment 100, including participant systems 110 and 130.

In some instances, executed data consistency module 243 may output the elements of formatted interaction data 244 and 246 to a block generation module 248 of CA system 152. Upon execution of the one or more processors of CA system 152, executed block generation module 248 may receive the elements of formatted interaction data 244 and 246, and may generate a corresponding hash value 250 that represents the elements of formatted interaction data 244 and 236. For example, executed block generation module 248 may generate hash value 250 based on an application of one or more hash cryptographic or non-cryptographic hash functions to respective portions (or entireties) of the elements of formatted interaction data 244 and 246, and examples of these hash functions include, but are not limited to, an SHA-256 hash function, an SHA-384 hash function, or an SHA-512 hash function. In some instances, the application of the one or more hash functions to the elements of formatted interaction data 244 and 246 may generate a corresponding hash value, e.g., hash value 250, having a length or composition that is consistent with permissioned distributed ledger 180, e.g., as maintained and accessed by one or more of the CA systems within environment 100, including CA system 152, as described herein.

In some instances, executed block generation module 248 may perform operations that generate an additional ledger block of permissioned distributed ledger 180, e.g., ledger block 252, that include the elements of formatted interaction data 244 and 246 and hash value 250. Further, executed block generation module 248 may perform additional operations that generate and apply a digital signature 254 to the elements of formatted interaction data 244 and 246 and to hash value 250 using master cryptographic key 162 of the centralized authority, and may package digital signature 254 into a corresponding portion of ledger block 252.

Additionally, although not illustrated in FIG. 2B, executed block generation module 248 may also perform operations that determine whether the current version of the encrypted set of centralized access or recordation permissions associated with the participants, or classes or types of participants, that operate within the insurance marketplace (e.g., encrypted centralized permissioning library 182 recorded within ledger block 188 of permissioned distributed ledger 180) is consistent with the elements of permissioning data maintained within local permissioning data store 156. For example, executed block generation module 248 may compute a reference hash value representative of decrypted permissioning data 238 (e.g., using any of the exemplary hash algorithms described herein), and may compute a local hash value represented in the elements of permissioning data currently maintained within local permissioning data store 156 (e.g., further using any of the exemplary hash algorithms described herein).

If the local hash value were inconsistent with the reference hash value, executed block generation module 248 may determine that encrypted centralized permissioning library 182 is no longer representative of the elements of permissioning data currently maintained within local permissioning data store 156. In some instances, executed block generation module 248 may perform operations (not illustrated in FIG. 2C) that generate an updated version of an encrypted centralized permissioning library by encrypting the elements of permissioning data currently maintained within local permissioning data store 156 using master cryptographic key 162. Further, although not illustrated in FIG. 2C, may perform any of the exemplary processes described herein to compute an updated hash value representative of the elements of formatted interaction data 244 and 246 and the updated version of an encrypted centralized permissioning library, and to package that updated hash value into a corresponding portion of ledger block 252, along with an updated digital signature applied using any of the techniques described herein.

Referring back to FIG. 2B, CA system 152 may perform additional operations that generate an updated permissioned distributed ledger 256 (e.g., a latest, longest version of the permissioned distributed ledger) by appending ledger block 252 to the ledger blocks of permissioned distributed ledger 180 (e.g., the prior version of the permissioned distributed ledger). For example, the additional operations may be established through a distributed consensus among other ones of CA systems 150 operating within environment 100, and may include, but are not limited to, the calculation of an appropriate proof-of-work or proof-of-stake by a distributed consensus module 258 prior to other of CA systems 150. In certain aspects, CA system 152 may broadcast evidence of the calculated proof-of-work or proof-of-stake to other ones of CA systems 150 across network 120 (e.g., as consensus data 260).

CA system 152 may also broadcast updated permissioned distributed ledger 256, which represents the latest, longest version of the permissioned distributed ledger, to the other CA systems 150 operating within environment 100. In some instances, not illustrated in FIG. 2B, CA system 152 may also broadcast updated permissioned distributed ledger 256 to one or more additional, or alternate, computing systems or devices permitted by the centralized authority to access and locally maintained the exemplary permissioned distributed ledgers described herein, such as participant systems 110 and 130. Further, although not illustrated in FIG. 2C, CA system 152 may generate and transmit, across network 120, a confirmation of the recordation of the elements of formatted interaction data 244 and 246 onto permissioned distributed ledger 256 to participant system 110, which may operations that modify a value of data flags 204 and 210 to reflect the now-recorded status of corresponding elements of interaction data 202 and 208.

Further, in some examples, a participant system operated by an additional insurance company, such as participant system 130, may receive requests, from one or more network-connected customer devices within environment 100, to provide a quote for insuring various assets owned or operated by corresponding ones of the customers, such as, but not limited to, a customer's vehicle. For instance, each of the provisioned quotes may specify a value of one or more policy parameters of a proposed insurance policy, and these one or more policy parameters may establish a set of terms and conditions that, upon acceptance by the corresponding one of the customers, would enable to insurance company to issue the proposed insurance policy to that customer. Examples of these policy parameters may include, but are not limited to, a temporal term of the policy, a type of coverage provided to the insured asset (e.g., liability, comprehensive, collision, etc.), an amount of coverage provided to the insured asset, or a premium associated with the policy.

To determine the values of the policy parameters that characterize a requested quote for a corresponding customer and a corresponding asset, participant system 130 may access elements of locally maintained data that characterize the interaction of the corresponding customer, or the corresponding asset, with the additional insurance company, e.g., elements of interaction data locally maintained within interaction data store 136. In many instances, however, the determination of the values of these policy parameters, and a further determination to provision the requested quote to the customer, may be based on additional information characterizing a prior or ongoing interaction of the corresponding customer, or the corresponding asset, with other participants in the insurance marketplace.

By way of example, this additional interaction information may identify or characterize additional insurance policies issued to the corresponding customer by other insurance companies within the insurance marketplace, may characterize a status of these additional insurance policies, may identify or characterize a number of claims submitted to these other insurance companies that involve the corresponding customer or the corresponding assets, including an outcome of these claims and any repairs applied to the corresponding asset. The disclosed embodiments are not limited to these examples of additional interaction data, and in other instances, the determination of the policy parameter values by participant system 130, and the decision to provision the quote, may be informed by any additional or alternate element of data characterizing an interaction between the corresponding customer or the corresponding asset and any of the exemplary participants in the insurance marketplace described herein.

In some examples, and to obtain the elements of additional interaction data, participant system 130 may perform operation that generate and transmit inquiry data to a plurality of additional participant systems operating within environment 100. As described herein, participant system 130 may transmit these discrete elements of inquiry data to each of the additional participant systems through corresponding programmatic interfaces maintained by these additional participant systems and further, based on a successful outcome of one or more authorization or consent protocols (e.g., an OAuth protocol implemented collectively by the participant system 130 and each of the additional participant systems). To facilitate such programmatic communications, however, each of the additional participant systems (and in some instances, participant system 130) often publishes documentation associated with the programmatic interface to other network-connected computing systems and devices associated with various participants in the insurance marketplace.

As described herein, the publication of the programmatic interfaces within the computing environment may increase a likelihood malicious third-party will attack the programmatic interface and access the interaction data elements maintained by each of these additional participant systems without authorization of consent (e.g., via an injection attack, a denial-of-service (DoS) attack, etc.). Moreover, and through these programmatic communications with these additional participant systems, participant system 130 may obtain elements of additional interaction data having mutually varying formats, structures, or compositions that differ from those elements of interaction maintained locally within interaction data store 136 and as such, the application programs executed by participant system 130 may be incapable of processing these elements of additional interaction data absent a performance of often significant reformatting, restructuring, or repopulation operations, which may reduce or even eliminate an ability of participant system 130 to process these elements of additional interaction data in providing the requested quote.

In some exemplary embodiments, described herein, participant system 130 may generate one or more elements of centralized inquiry data suitable for transmission not to the other participant systems operating within environment 100, but instead to the one or more CA systems 150 associated with the centralized authority, including CA system 152. As described herein, each of CA systems 150, including CA system 152, may maintain a local copy of a permissioned distributed ledger (e.g., permissioned distributed ledger 180 of FIG. 1 or updated permissioned distributed ledger 256 of FIG. 2B) that records, within one or more ledger blocks, an encrypted set of centralized access permissions associated with the participants, or classes or types of participants, that operate within the insurance marketplace (e.g., encrypted centralized permissioning library 182 of FIG. 1), elements of formatted interaction data characterizing the interaction between various participants in the insurance marketplace (e.g., interaction ledger blocks 190, 192, and 252 of FIG. 2B), and elements of code that, when executed by one or more of CA systems 150, establish a distributed smart contract facilitating a permissioned access to the immutably recorded elements of interaction data by participant system 130 (e.g., distributed permissioning engine 184 of FIG. 2B).

Responsive to the receipt of the centralized inquiry data, one or more of CA systems 150, such as CA system 152, may access the permissioned distributed ledger and execute distributed permissioning engine 184 (e.g., to implement the distributed smart contract), and to perform any of the exemplary centralized permissioning operations described herein to, among other things: decrypt the encrypted set of centralized access permissions using a master cryptographic key associated with the centralized authority; establish a level or type of data access granted participant system 130 by the centralized authority; parse the ledger blocks of the permissioned distributed ledger to access a subset of the elements of immutably recorded interaction data that are responsive to the centralized inquiry data and consistent with the granted level or type of granted data access; and to provision the subset of the interaction data elements to participant system 130 in response to the centralized inquiry data. Certain of the exemplary processes described herein may, among other things, which provision accessible elements of interaction data having a centralized format, structure, and composition, to participant system 130 in response to a single query broadcast to one of more of CA systems 150, may be implemented in addition to, or as an alternate to, existing processes that require participant system 130 to transmit participant-specific requests to a participant system associated with each of a plurality of participant systems within the insurance marketplace, and to receive elements of interaction data from these participant system having varied, and mutually incompatible, formats, structures, or compositions.

Figure 3A:
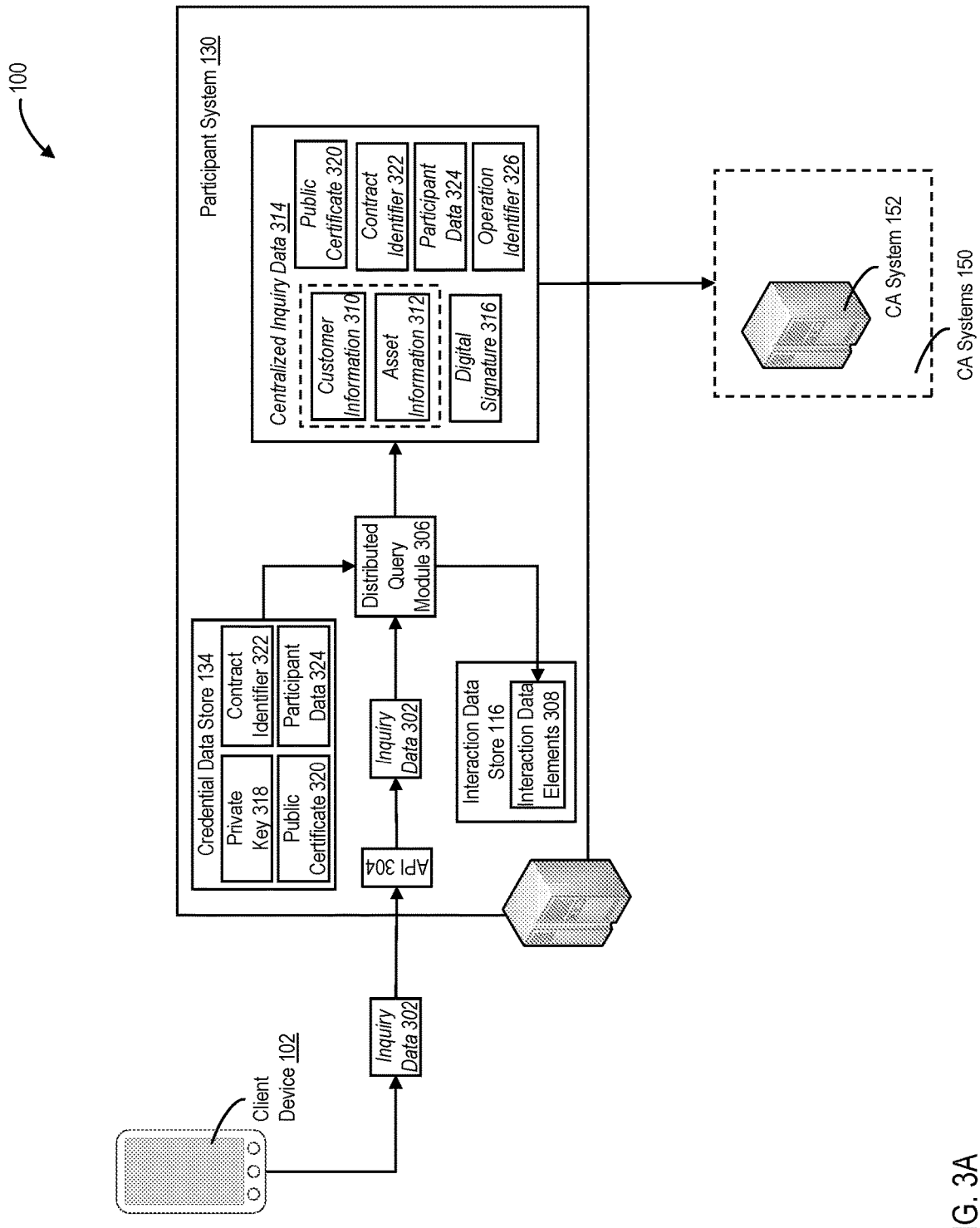

Referring to FIG. 3A, participant system 130 may receive one or elements of inquiry data 302 from a customer device, e.g., client device 102 operated by user 101. In some examples, inquiry data 302 may corresponding to a request, by user 101, for a quote from the additional insurance company to insure an additional vehicle owned and operated by user 101, and inquiry data 302 may include information that characterizes the requested quote (e.g., a requested type or amount of coverage), that identifies the additional vehicle (e.g., a vehicle identification number (VIN), a government-issued identifier, such as a tag number, etc.), and that identifies user 101 (e.g., a name and address of user 101, a government-issued identifier of user 101, such as a driver's license number, etc.). Additionally, in some instances, inquiry data 302 may also include information identifying client device 102 or one or more application programs executed by client device 102 (e.g., a network address, such as an IP address or a MAC address, an application cryptogram, etc.), which may enable participant system 130 to verify an identity of client device 102 and an authenticity of inquiry data 302.

A programmatic interface maintained by participant system 130, such as application programmatic interface (API) 304, may receive inquiry data 302, and may route inquiry data 302 to a distributed query module 306 of participant system 130. Upon execution by the one or more processors of participant system 130, distributed query module 306 may perform operations that, based on information maintained within inquiry data 302, verify the identity of client device 102 and as such, the authenticity of inquiry data 302 (e.g., based on a determination that the IP or MAC address of client device 102 matches a corresponding reference IP or MAC address maintained within the one tangible, non-transitory memories, based on a determination that the application cryptogram is associated with an expected structure or format, etc.).

Responsive to a successful verification of the identity of client device 102 and additionally, or alternatively, a successful verification of the authenticity of inquiry data 302, executed distributed query module 306 may perform operations that store all or a portion of inquiry data 302 within the one or more tangible memories, e.g., as interaction data 308 within a portion of interaction data store 136. Further, executed distributed query module 304 may also parse inquiry data 302 to extract customer information 310 that identifies user 101 (e.g., the name and address of user 101, the driver's license number of user 101, etc.) and asset information 312 that identifies the additional vehicle associated with user 101 (e.g., the vehicle identification number (VIN), the government-issued tag number, etc.), and may perform operations that package customer information 310 and asset information 312 into corresponding portions of centralized inquiry data 314.

Further, in some instances, executed distributed query module 306 may perform additional operations that generate and apply a digital signature 316 to customer information 310 and to asset information 312, e.g., using a private cryptographic key 318 of participant system, may package digital signature 316 and a public key certificate 320 associated with participant system 130 (e.g., which include corresponding public cryptographic key of participant system 130) within additional portions of centralized inquiry data 314. Executed distributed query module 306 may also obtain a contract identifier 322 associated with the distributed smart contract from credential data store 134, and may package contract identifier 322 within a further portion of centralized inquiry data 314. By way of example, contract identifier 322 may include, but is not limited to, a network address associated with distributed permissioning engine 184 (e.g., as recorded onto permissioned distributed ledgers 180 and 256), a public cryptographic key associated with the centralized authority (e.g., as provisioned to participant system 130 by CA system 152), or any additional or alternate element of data that, upon processing by one or more of CA systems 150, such as CA system 152, triggers an execution of distributed permissioning engine 184.

In addition, executed distributed query module 306 may also perform operations that package, into corresponding portions of centralized inquiry data 314, participant data 324 that uniquely identifies participant system 130 or the additional insurance company (e.g., the participant associated with participant system 130). Further, executed distributed query module 306 may perform additional operations that generate and package, into corresponding portions of centralized inquiry data 314, an operation identifier 326 that identifies an operation associated with centralized inquiry data 314, e.g., an inquiry requesting elements of interaction data immutably recorded onto the exemplary permissioned distributed ledgers described herein. Examples of participant data 324 include, but are not limited to, a name of the insurance company, a participant class that characterizes the insurance company (e.g., the insurance-company class described herein), or a network address of participant system 130 (e.g., an IP or MAC address), and in some instances, executed distributed query module 306 may obtain all or a portion of participant data 324 from credential data store 134. Executed distributed query module 306 may perform further operations that cause participant system 110 to broadcast centralized inquiry data 314 across network 120 to one or more of CA systems 150, such as CA system 152, through a secure, programmatic communications channel.

Figure 3B:
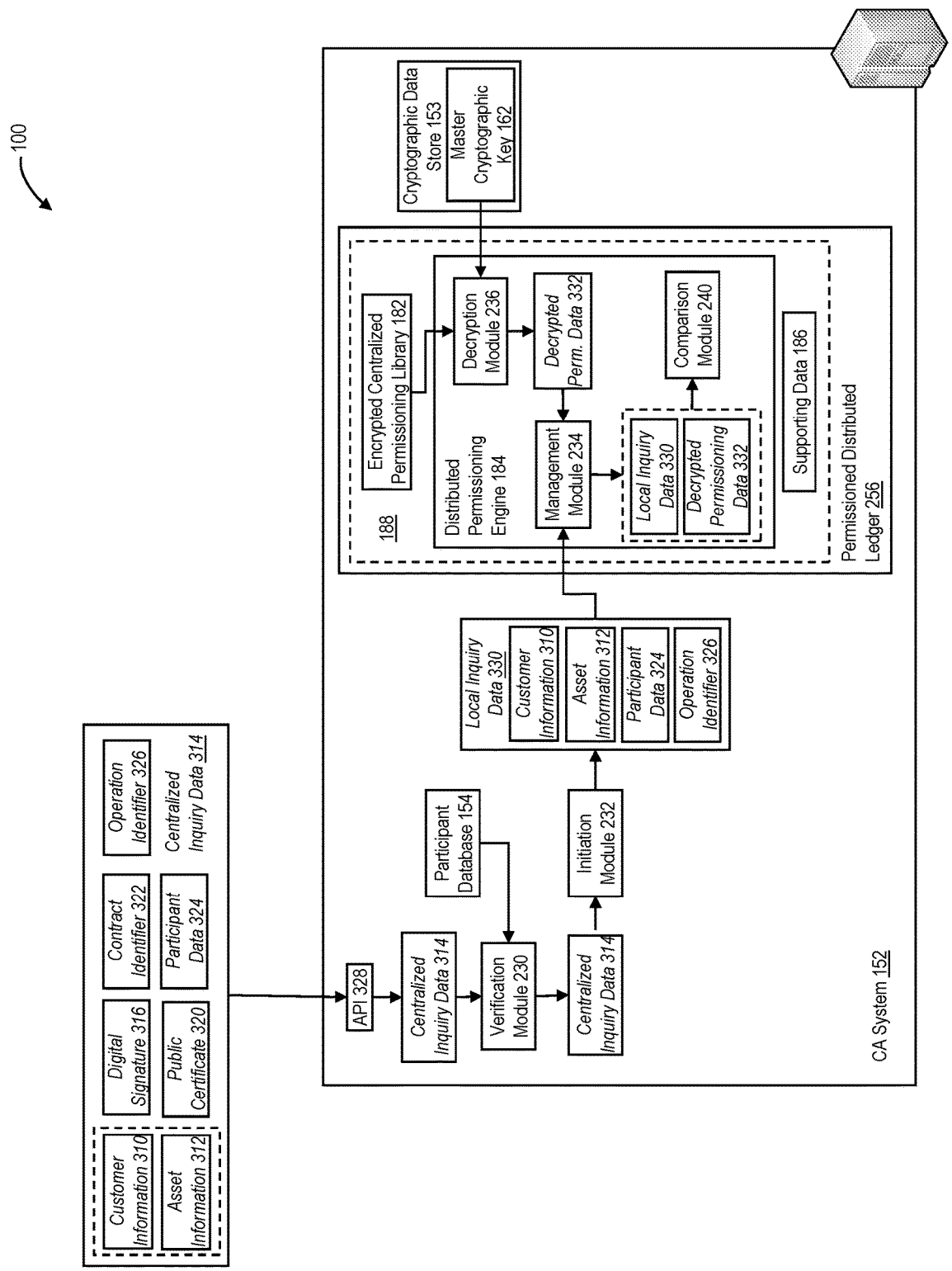

Referring to FIG. 3B, CA system 152 (and additionally, or alternatively, an additional one or more of CA systems 150) may receive centralized inquiry data 314 through a corresponding programmatic interface, such as application programming interface (API) 328, and may route centralized inquiry data 314 to verification module 230. Upon execution by the one of more processors of CA system 152, verification module 228 may perform operations that verify that the participant associated with participant system 130 (e.g., the additional insurance company) represents one of the participants in the insurance marketplace recognized by the centralized authority (e.g., based on a comparison between the portions of participant data 324 and one or more data records maintained by CA system 152).

If, for example, executed verification module 230 were to determine that the additional insurance company represents one of the recognized participants (e.g., that the data records of participant database 154 fails to include or reference the participant name or the network address of participant system 130, as included within participant data 324), executed verification module 230 may discard centralized inquiry data 314 and generate an error message indicative of the failed verification, which CA system 152 may relay back to participant system 130.

Alternatively, if executed verification module 230 were to determine that the additional insurance company represents one of the recognized participants (e.g., that the data records of participant database 154 includes or reference the participant name or the network address of participant system 130), executed verification module 230 may perform further operations that verify the digital signature applied to customer information 310 and asset information 312, e.g., digital signature 316, and as such, verify an integrity of customer information 310 and asset information 312, and further, of centralized inquiry data 314. By way of example, executed verification module 230 may access public key certificate 320 of participant system 130 from centralized inquiry data 314, extract the public cryptographic key of participant system 130 from public key certificate 320, and verify digital signature 316 based on the extracted public cryptographic key.

In one instance, if executed verification module 230 were unable to verify digital signature 316, executed verification module 230 may determine that at least a portion of centralized inquiry data 314 became corrupted during transmission from participant system 130. Executed verification module 230 may perform operations that discard centralized inquiry data 314, and may generate an error message indicative of the failed verification, which CA system 152 may relay back to participant device 130.

Alternatively, if executed verification module 230 were to successfully verify digital signature 316, executed verification module 230 may perform operations that store centralized inquiry data 314 within an accessible portion of the one or more tangible, non-transitory memories, and that provide centralized inquiry data 314 as an input to initiation module 232 of CA system 152. When executed by the one or more processors of CA system 152, initiation module 232 may parse centralized inquiry data 314 to detect a presence of contract identifier 322, which identifies the distributed smart contract. In response to the detection of contract identifier 322, executed initiation module 232 may perform operations that access ledger block 188 of permissioned distributed ledger 256 (e.g., as maintained within the one or more tangible, non-transitory memories), and that generate one or more programmatic commands that execute distributed permissioning engine 184, which implements the distributed smart contract described herein and facilitates access to the immutably recorded elements of interaction data in accordance with elements of encrypted permissioning data, e.g., as maintained within encrypted centralized permissioning library 184.

As illustrated in FIG. 3B, executed initiation module 232 may extract customer information 310, asset information 312, participant data 324, and operation identifier 326 from centralized inquiry data 314, and may package customer information 310, asset information 312, participant data 324, and operation identifier 326 into corresponding portions of local inquiry data 330. In some instances, executed initiation module 232 may provide local inquiry data 330 as an input to management module 234 of executed distributed permissioning engine 184, and responsive to the receipt of local inquiry data 330, management module 234 may generate one or more programmatic commands that trigger and execution of decryption module 236 of executed distributed permissioning engine 184.

As described herein, executed decryption module 236 may access a master cryptographic key associated with the centralized authority (e.g., master cryptographic key 162 maintained within cryptographic data store 153), and may parse ledger blocks 188, 190, 192, and 252 of permissioned distributed ledger 256 (not illustrated in FIG. 3B) to identify and access a current version of an encrypted set of centralized access or recordation permissions associated with the participants, or classes or types of participants, that operate within the insurance marketplace, e.g., encrypted centralized permissioning library 182 recorded within ledger block 188. In some instances, executed decryption module 236 may decrypt the encrypted centralized permissioning library 182 using master cryptographic key 162, and may generate elements of decrypted permissioning data 332 that include the decrypted set of centralized access or recordation permissions associated with the participants, or classes or types of participants, that operate within the insurance marketplace.

In other examples, not illustrated in FIG. 3B, executed decryption module 236 identify an additional encrypted centralized permissioning library within a subsequent one of the ledger blocks of permissioned distributed ledger 256 (e.g., one of ledger blocks 190, 192, or 252 recorded onto permissioned distributed ledger 256 at times at a time subsequent to ledger block 188), and may establish that the additional encrypted centralized permissioning library represents the current version of the encrypted set of centralized access or recordation permissions. Decryption module 236 may decrypt the additional encrypted centralized permissioning library using master cryptographic key 162 to generate decrypted permissioning data 332.

Further, executed decryption module 236 may provide decrypted permissioning data 332 as an input to management module 234, which may perform further operations that route local inquiry data 330 and decrypted permissioning data 332 to a comparison module 240 of executed distributed permissioning engine 184. In some instances, and based on participant data 324 (e.g., that identifies participant system 130 and the additional insurance company) and decrypted permissioning data 332, identify one or more access permissions granted to participant system 130, or to the additional insurance company, by the centralized authority. For example, decrypted permissioning data 332 may include discrete data elements that characterize corresponding ones of the centralized access or recordation permissions, and comparison module 240 may identify one or more of the discrete elements that reference a corresponding access permission and further, and that include or reference an identifier of participant system 130 (e.g., the IP or MAC address) or an identifier of the additional insurance company (e.g., the name of the insurance company, the insurance-company class associated with the insurance company, etc.).

Figure 3C:
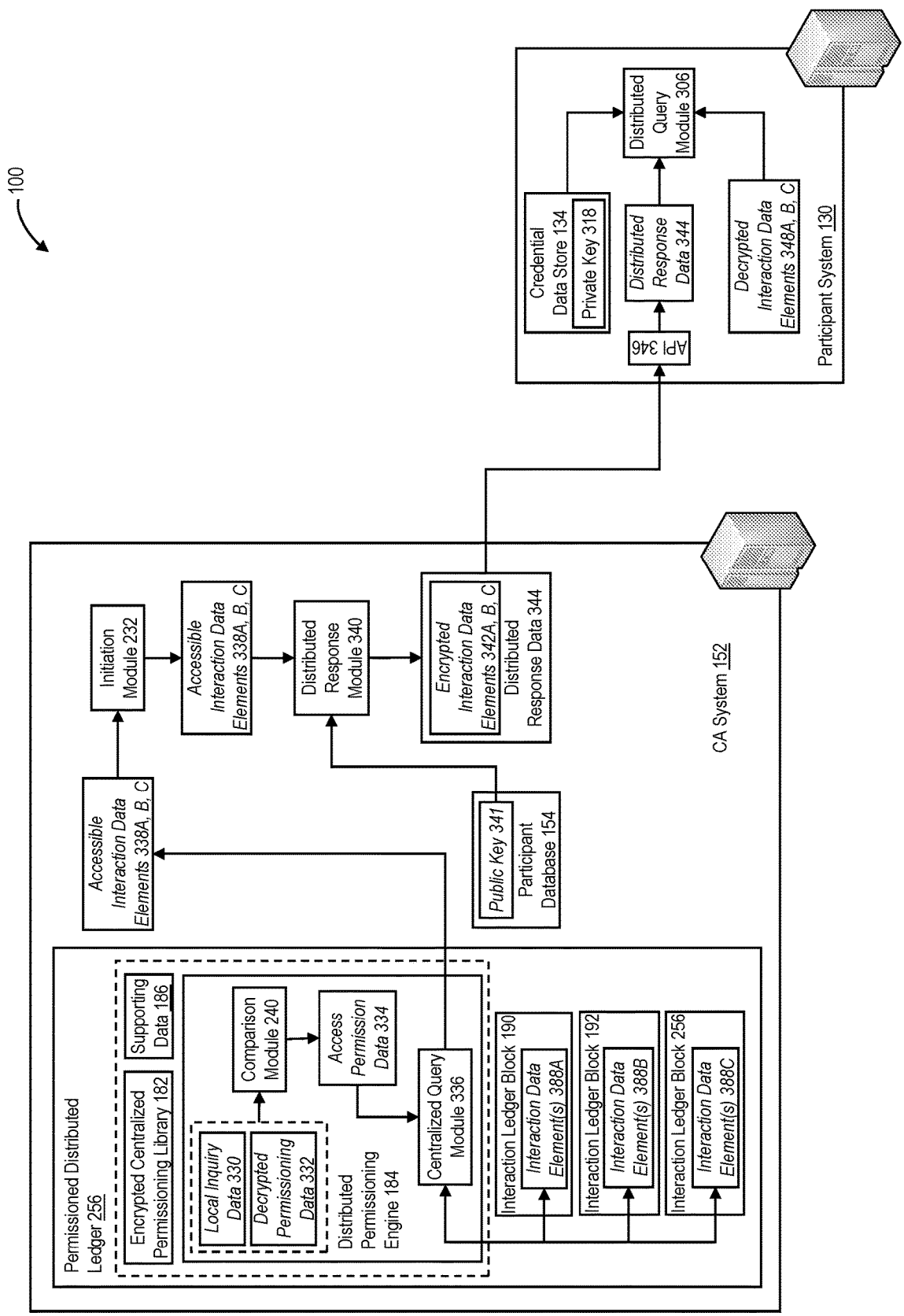

Referring to FIG. 3C, comparison module 240 may perform operations that package each of the one or more identified elements of decrypted permissioning data 332, which characterize centralized access permissions associated with participant system 130 and/or the additional insurance company, into corresponding portions of access permission data 334. For example, the centralized access permissions specified within access permission data 334 may include one or more default, class-specific access permissions may enable a participant system associated with the insurance-company class, e.g., participant system 110 associated with the additional insurance company, to access all recorded interaction data generated by the additional insurance company.

Further, the one or more default, class-specific access permissions may permit participant system 110 to access only insensitive elements of recorded interaction data generated by other participant systems and other participants in the insurance marketplace (e.g., information identifying an existence and pendency of other insurance policies involving user 101 or the additional vehicle, or information identifying claims involving user 101 or the additional vehicle, but not any recorded elements of customer data or participant-specific data, such as customer identifiers or policy numbers). Additionally, in some instances, the centralized access permissions specified within access permission data 334 may also include one or more participant-specific access permissions associated with the additional insurance company, such as those described herein that modify the one or more default access permissions described herein.

In some examples, comparison module 240 may provide parse local inquiry data 330 to obtain customer information 310 that identifies user 101 (e.g., the name and address of user 101, the driver's license number of user 101, etc.) and asset information 312 that identifies the additional vehicle associated with user 101 (e.g., the vehicle identification number (VIN), the government-issued tag number, etc.), and to provide customer information 310, asset information 312, and access permission data 334 as an input to a centralized query module 336 of executed distributed permissioning engine 184. In some instances, centralized query module 336 may perform operations that access one or more interaction ledger blocks recorded onto permissioned distributed ledger 256, such as, but not limited to, ledger blocks 188, 190, 192, and 252, to identify elements of recorded interaction data that are consistent with the centralized access permissions specified within access permission data 334 and further, that include, or reference, at least a portion of customer information 310 (e.g., the name and address of user 101, the driver's license number of user 101, etc.) and additionally, or alternatively, with at least a portion of asset information 312 (e.g., the VIN of the additional vehicle, the tag number of the additional vehicle, etc.).

For instance, as illustrated in FIG. 3B, centralized query module 336 may establish that elements 338A, 338B, and 338C of interaction data recorded within respective ones of ledger block 190, 192, and 252 are accessible to participant system 130 (e.g., based on the centralized access permissions specified within access permission data 334) and are relevant to one or more prior interactions between user 101, or the additional vehicle, and one or more additional insurance companies, supported or associated business entities (such as repair shops), regulatory, judicial, or governmental entities, or any additional or alternate ones of the participants in the insurance marketplace described herein. Elements 338A, 338B, and 338C of interaction data may, in some examples, identify an existence or status of one or more additional insurance policies issued to user 101 or involving the additional vehicle, identify a submission and an outcome of one or more claims involving these insurance policies, or identify one or more citations issued to user 101 by a law-enforcement agency during operation of the additional or other vehicles. The disclosed embodiments are, however, not limited to these examples of accessible interaction data, and in other instances, accessible elements 338A, 338B, and 338C of interaction data characterize any additional or alternate interaction between user 101 or the additional vehicle recorded onto permissions distributed ledger 256.

Centralized query module 336 may provide accessible elements 338A, 338B, and 338C of interaction data to executed initiation module 232 as a response to local inquiry data 330, either directly (e.g., as illustrated in FIG. 3B) or through management module 234 of executed distributed permissioning engine 184 (e.g., not illustrated in FIG. 3B). In some instances, executed initiation module 232 may receive accessible elements 338A, 338B, and 338C of interaction data, and may route the received data to a distributed response module 340 of CA system 152. When executed by the one or more processors of CA system 152, distributed response module 340 may perform operations that encrypt each of accessible elements 338A, 338B, and 338C of interaction data using a public cryptographic key 341 of participant system 130 (e.g., as maintained within participant database 154), and may package each of encrypted elements 342A, 342B, and 342C of interaction data into a corresponding portion of distributed response data 344. Further, although not illustrated in FIG. 3C, executed distributed response module 340 may also apply a digital signature to encrypted elements 342A, 342B, and 342C of interaction data (e.g., using a private cryptographic key associated with the centralized authority, as maintained within cryptographic data store 153), and package the applied digital signature and a public key certificate of the centralized authority (which includes a corresponding public cryptographic key), into corresponding portions of distributed response data 344.

CA system 152 may perform operations that transmit distributed response data 344 across network 120 to participant system 130, e.g., using any of the communications protocols described herein. In other examples, not illustrated in FIG. 3C, CA system 152 may generate and transmit distributed response data 344 to participant system 130 based on an implementation of one or more of the exemplary consensus-based protocols described herein, e.g., in conjunction with the additional or alternate ones of CA systems 150 within environment 100. For instance, and through the collective implementation of these exemplary consensus-based protocols, CA system 152 may calculate an appropriate proof-of-work or proof-of-stake by (e.g., using distributed consensus module 258) prior to other of CA systems 150. Further (also not illustrated in FIG. 3C), CA system 152 may broadcast evidence of the calculated proof-of-work or proof-of-stake to each additional or alternate one of CA systems 150 across network 120 prior to transmitting distributed response data 344 to participant system 130.

As illustrated in FIG. 3C, a programmatic interface maintained by participant system 130, such as application programmatic interface (API) 346, may receive distributed response data 344, and may route distributed response data 344 to executed distributed query module 306. In some instances, and in response to a successful validation of the applied digital signature, distributed query module 306 may access a private cryptographic key of participant system 130, e.g., private cryptographic key 318 maintained within credential data store 134, and may decrypt encrypted elements 342A, 342B, and 342C using private cryptographic key 318 to generate decrypted elements 348A, 348B, and 348C of interaction data characterizing the prior or ongoing interactions between user 101 and/or the additional vehicle and one or more additional participants in the insurance marketplace.

Further, although not illustrated in FIG. 3C, participant system 130 may perform operations that the determine each of the policy parameter values based on the decrypted elements 348A, 348B, and 348C of interaction data and additional interaction data maintained within local interaction data store 136, and may generate, and provision to client device 102, data specifying the requested quote for the insurance policy based on the determined policy parameter values. In some instances, one or more application programs executed by participant system 130, such as distributed query module 306, may generate one or more interface elements representative of all, or a selected portion, of decrypted elements 348A, 348B, and 348C of interaction data, and present these generated interface elements on a corresponding digital interface (e.g., through a display unit of participant system 130. Additionally, or alternatively, the one or more executed application programs, such as executed distributed query module 306, may perform further operations that cause participant system 130 to transmit all or a selected portion of decrypted elements 348A, 348B, and 348C of interaction data to another network-connected device or system within environment 100, such as client device 102.

Further, in some instances, participant system 130 may store data indicative of the provisioned quote, including the policy parameter values, within a corresponding portion of local interaction data store 136, e.g., as further elements 350 of interaction data. Although not illustrated in FIG. 3C, participant system 130 may perform any of the exemplary processes described herein to submit all or a portion of elements 350 of interaction data to one or more of CA systems 150 for recordation onto permissioned distributed ledger 256 in accordance with the centralized recordation permissions granted to participant system 130 and/or the additional insurance company.

Figure 4:
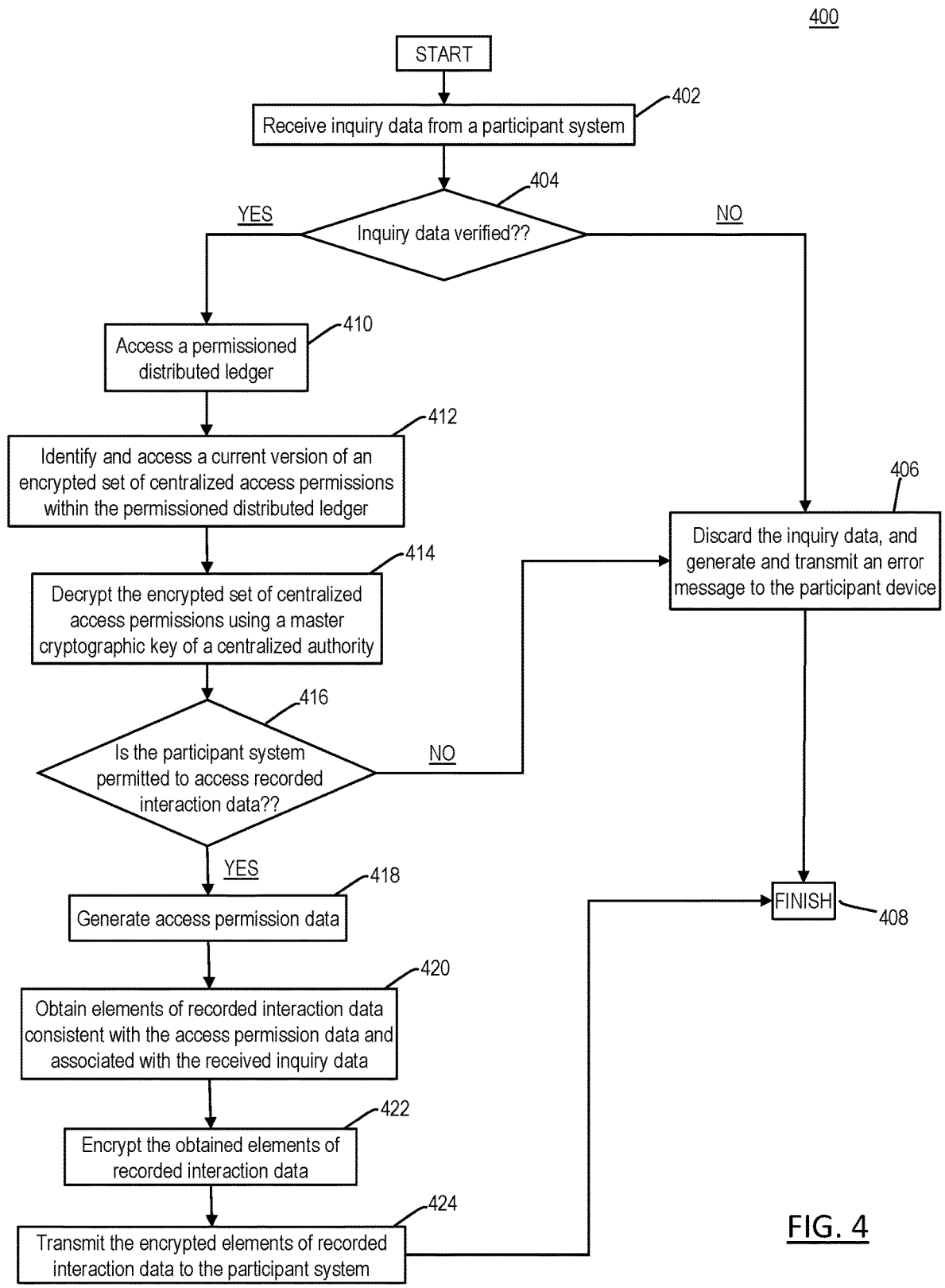
FIG. 4 is a flowchart of an exemplary process for tracking, managing, and provisioning interaction data among network-connected computing systems and devices using a permissioned distributed ledger, consistent with the disclosed embodiments.

FIG. 4 is a flowchart of an exemplary process 400 for tracking, managing, and provisioning interaction data among network-connected computing systems and devices using a permissioned distributed ledger, in accordance with the disclosed embodiments. In some instances, one or more network-connected computing systems associated with a centralized authority, such as CA system 152, may perform the steps of exemplary process 400, either based on executable instructions maintained within one or more tangible, non-transitory memories, or based on executable instructions recorded onto one or more ledger blocks of a permissioned distributed ledger, such as, but not limited to, one or more of permissioned distributed ledgers 180 and 256 described herein.

Referring to FIG. 4, CA system 152 may receive inquiry data from a network-connected participant system associated with a participant in an organization or enterprise, such as participant system 110 or participant system 130 (e.g., in step 402). For example, the participant may correspond to an insurance company operating within an insurance marketplace (e.g., the enterprise), and the inquiry data may be associated with a request, by that participant system, to obtain information characterizing prior or ongoing interactions between a particular customer (or a particular asset, such as a vehicle) and one or more additional participants in the insurance marketplace, such as, but not limited to additional insurance companies, supported or associated business entities (e.g., a repair shop), or one or more judicial, regulatory, or governmental entities, as described herein.

In some examples, and as described herein, the received inquiry data may include participant information that identifies the participant or the participant system (e.g., a name of the insurance company, a participant class associated with the insurance company, or a network address of the participant system, such as an IP or MAC address), customer information that identifies the particular customer (e.g., (e.g., a name and address of the customer, a government-issued identifier of the customer, such as a driver's license number, etc.), and asset information identifying the particular asset (e.g., a vehicle identification number (VIN), a government-issued identifier, such as a tag number, etc.). Further, and as described herein, the inquiry data may also include a digital signature applied to the participant, customer, or asset information by the participant system (e.g., using any of the exemplary processes described herein). The inquiry data may also include a unique contract identifier (e.g., a public cryptographic key of the centralized authority) associated with one or more elements of executable code recorded onto the permissioned distributed ledger, which when executed by the one or more processors of CA system 152, establish a distributed smart contract facilitating a permissioned access to the recorded elements of interaction data by the participant system.

In step 404, CA system 152 may perform any of the exemplary processes described herein to verify an integrity of the received inquiry data (e.g., based on a verification of the applied digital signature) and to verify that the participant associated with the participant system represents a participant recognized by the centralized authority (e.g., based on a comparison of the participant information based on locally maintained participant data, e.g., within participant database 154 of FIG. 1). If, for example, CA system 152 were unable to verify the applied digital signature, or were unable to verify that the participant represents a recognized participant (e.g., step 404; NO), CA system 152 may discard the received inquiry data, and may generate an error message indicative of the failed verification, which CA system 152 may relay back to participant device 130 (e.g., in step 406). Exemplary process 400 is then complete in step 408.

Alternatively, if CA system 152 were to verify successfully the applied digital signature and that the participant represents the recognized participant (e.g., step 404; YES), CA system 152 may access a copy of a permissioned distributed ledger maintained by CA system 152 (e.g., in step 410), and may perform any of the exemplary processes described herein the parse the ledger blocks of the permissioned distributed ledger to identify and access a current version of an encrypted set of centralized access permissions associated with the participants, or classes or types of participants, that operate within the enterprise (e.g., in step 412). In some examples, and as described herein, CA system 152 perform further operations that identify and execute the code elements recorded immutably onto the permissioned distributed ledger, which may cause CA system 152 to parse the ledger blocks of the permissioned distributed ledger to access the current version of the encrypted set of centralized access permissions (e.g., by invoking the distributed smart contract).

CA system 152 may also perform any of the exemplary processes described herein to decrypt the current version of an encrypted set of centralized access permissions using a master cryptographic key associated with the centralized authority (e.g., in step 414). Further, and based on the decrypted et of centralized access permissions, CA system 152 may also perform any of the exemplary processes described herein to determine whether one or more of the centralized access permissions are associated with the participant system and as such, whether centralized authority permits the participant system to access element elements of interaction data recorded immutably onto the distributed ledger in accordance with the centralized access permissions (e.g., in step 416). In some examples, in steps 414 and 416, CA system 152 may perform one or more of these exemplary processes in response to the execution of the code elements recorded immutably onto the permissioned distributed ledger and the invocation of the distributed smart contract.

If, for example, CA system 152 were to establish that none of the centralized access permissions are application to the participant system or to the participant (e.g., step 416; NO), CA system 152 may determine that the centralized authority declined to grant the participant system access to any elements of interaction data recorded immutably onto the permissioned distributed ledger. Exemplary process 400 may pass back to step 406, and CA system 152 may perform any of the exemplary processes described herein to discard the received inquiry data, and may generate an error message indicative of the failed verification, which CA system 152 may relay back to participant device 130. Exemplary process 400 is then complete in step 408.

Alternatively, if at least one of the centralized access permissions is applicable to the participant system or to the participant (e.g., step 416; YES), CA system 152 may perform any of the exemplary processes described herein to generate elements of access permission data that characterize each of the centralized access permissions associated with the participant system and/or the participant (e.g., in step 418). As described herein, the centralized access permissions associated with the participant system and/or the participant may include one or more default, class-specific access permissions and additionally, or alternatively, one or more participant-specific access permissions that modify the default, class-specific access permissions. In some examples, CA system 152 may perform one or more of these exemplary processes in step 418 responsive to the execution of the code elements recorded immutably onto the permissioned distributed ledger, and as such, to the invocation of the distributed smart contract.

CA system 152 may also perform any of the exemplary processes described herein to access one or more interaction ledger blocks recorded onto the permissioned distributed ledger, and to obtain elements of recorded interaction data within these accessed interaction ledger blocks that are consistent with the centralized access permissions specified within the access permission data and further, that include, or reference, at least a portion of the customer information and additionally, or alternatively, at least a portion of the asset information specified within the received inquiry data (e.g., in step 420). In some examples, CA system 152 may perform one or more of these exemplary processes in step 420 responsive to the execution of the code elements recorded immutably onto the permissioned distributed ledger, and as such, to the invocation of the distributed smart contract.

Further, CA system 152 may also perform any of the exemplary processes described herein to encrypt the obtained elements of recorded interaction data, which are accessible to the participant system and/or or the participant, and which are consistent with the received inquiry data, using a public cryptographic key of the participant system (e.g., in step 422). CA system 152 may perform further operation that transmit, or provision, the encrypted elements of recorded interaction data to the participant system across a corresponding communications network (e.g., in step 424). Exemplary process 400 is then complete in step 408.

Figure 5:
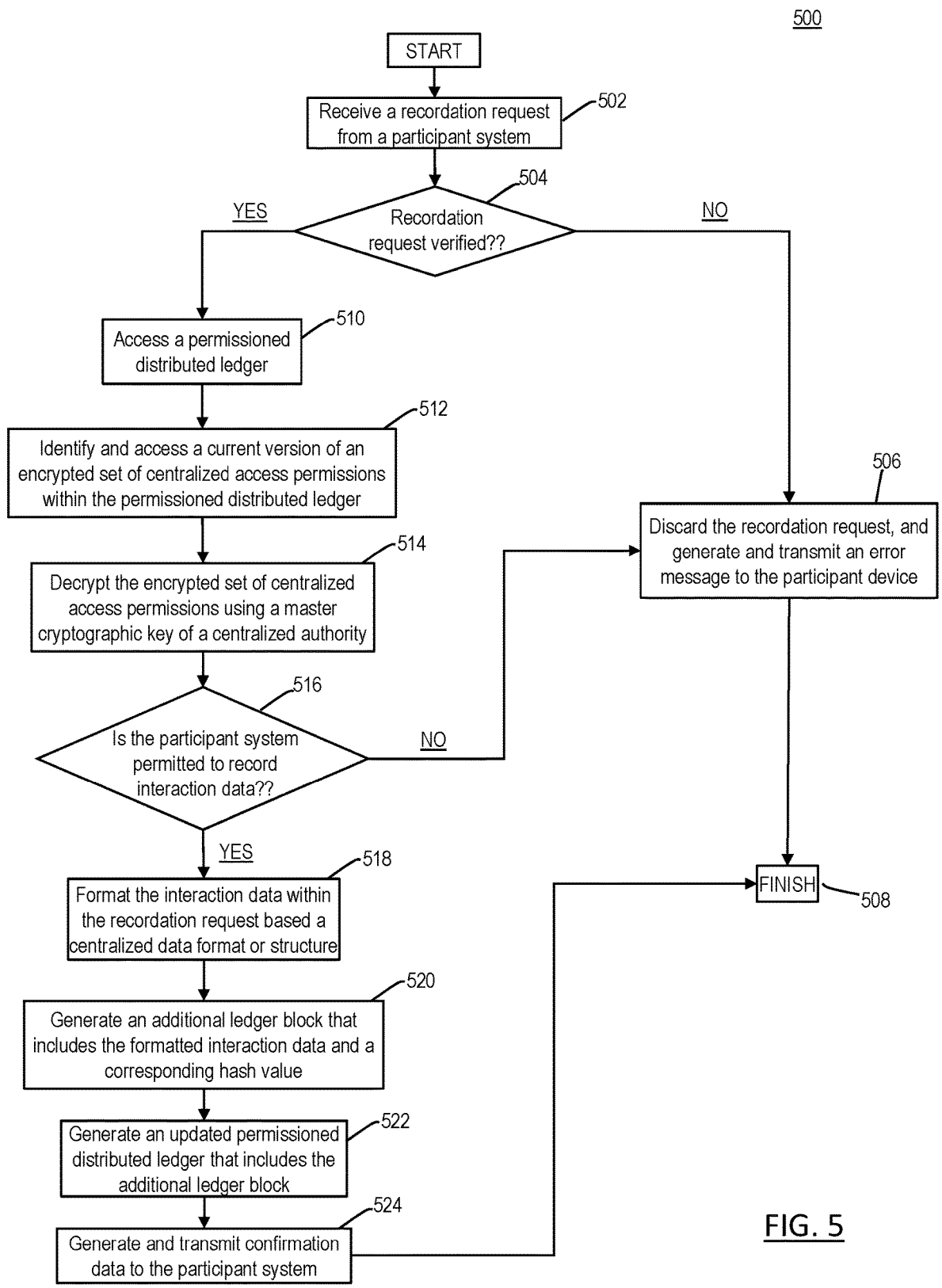
FIG. 5 is a flowchart of an exemplary process for recording elements of interaction data onto a permissioned distributed ledger based on encrypted centralized access permissions, consistent with the disclosed embodiments.

FIG. 5 is a flowchart of an exemplary process 500 for recording elements of interaction data onto a permissioned distributed ledger based on encrypted centralized access permissions, in accordance with the disclosed embodiments. In some instances, one or more network-connected computing systems associated with a centralized authority, such as CA system 152, may perform the steps of exemplary process 500, either based on executable instructions maintained within one or more tangible, non-transitory memories, or based on executable instructions recorded onto one or more ledger blocks of a permissioned distributed ledger, such as, but not limited to, one or more of permissioned distributed ledgers 180 and 256 described herein.

Referring to FIG. 5, CA system 152 may receive a recordation request from a network-connected participant system associated with a participant in an organization or enterprise, such as participant system 110 or participant system 130 (e.g., in step 502). For example, the participant may correspond to an insurance company operating within an insurance marketplace (e.g., the organization of enterprise), and a payload portion of the recordation request may include elements of interaction data that characterizes an interaction between the insurance company and one or more additional, or alternate, participants in the insurance marketplace, such as, but not limited to additional insurance companies, supported or associated business entities (e.g., a repair shop), or one or more judicial, regulatory, or governmental entities, as described herein.

In some examples, and as described herein, the received recordation request may also include information that identifies the participant or the participant system (e.g., a name of the insurance company, a participant class associated with the insurance company, or a network address of the participant system, such as an IP or MAC address), and a digital signature applied to payload portion by the participant system (e.g., using any of the exemplary processes described herein). The inquiry data may also include a unique contract identifier (e.g., a public cryptographic key of the centralized authority) associated with one or more elements of executable code recorded immutably onto the permissioned distributed ledger, which when executed by the one or more processors of CA system 152, establish a distributed smart contract facilitating a permissioned recordation of the interaction data within an additional ledger block of the permissioned distributed ledger.

In step 504, CA system 152 may perform any of the exemplary processes described herein to verify an integrity of the received recordation request (e.g., based on a verification of the applied digital signature) and to verify that the participant associated with the participant system represents a participant recognized by the centralized authority (e.g., based on a comparison of the participant information based on locally maintained participant data, e.g., within participant database 154 of FIG. 1). If, for example, CA system 152 were unable to verify the applied digital signature, or were unable to verify that the participant represents a recognized participant (e.g., step 504; NO), CA system 152 may discard the received recordation request, and may generate an error message indicative of the failed verification, which CA system 152 may relay back to participant device 130 (e.g., in step 506). Exemplary process 500 is then complete in step 508.

Alternatively, if CA system 152 were to successfully verify the applied digital signature and verify that the participant represents the recognized participant (e.g., step 504; YES), CA system 152 may access a copy of a permissioned distributed ledger maintained by CA system 152 (e.g., in step 510), and may perform any of the exemplary processes described herein the parse the ledger blocks of the permissioned distributed ledger to identify and access a current version of an encrypted set of centralized recordation permissions associated with the participants, or classes or types of participants, that operate within the enterprise (e.g., in step 512). In some examples, and as described herein, CA system 152 perform further operations in step 512 that identify and execute the code elements recorded immutably onto the permissioned distributed ledger, which may cause CA system 152 to parse the ledger blocks of the permissioned distributed ledger to access the current version of the encrypted set of centralized access permissions (e.g., by invoking the distributed smart contract).

CA system 152 may also perform any of the exemplary processes described herein to decrypt the current version of an encrypted set of centralized recordation permissions using a master cryptographic key associated with the centralized authority (e.g., in step 514). As described herein, the decrypted set of centralized recordation permissions may include one or more default, class-specific recordation permissions and additionally, or alternatively, one or more participant-specific recordation permissions that modify the default recordation permissions. Further, and based on the decrypted set of centralized recordation permissions, CA system 152 may further perform any of the exemplary processes described herein to determine, based on the decrypted set of centralized recordation permissions, whether the centralized authority permits the participant system (and as such, the participant) to record the elements of interaction data within the payload portion of the received recordation request onto an additional ledger block of the permissioned distributed ledger (e.g., in step 516). In some instances, CA system 152 may perform one or more of these exemplary processes in steps 514 and 516 responsive to the execution of the code elements recorded immutably onto the permissioned distributed ledger, and as such, to the invocation of the distributed smart contract.

If, for example, CA system 152 were to establish that the participant system and/or the participant is not permitted to record any elements of interaction data onto the permissioned distributed ledger (e.g., step 516; NO), exemplary process 500 may pass back to step 506. In some examples, CA system 152 may perform any of the exemplary processes described herein to discard the received inquiry data, and generate an error message indicative of the failed verification, which CA system 152 may relay back to participant device 130. Exemplary process 500 is then complete in step 508.

Alternatively, if the centralized authority permits the participant system and/or the participant to record the elements of interaction data onto the permissioned distributed ledger (e.g., step 516; YES), CA system 152 may perform any of the exemplary processes described herein to modify a structure or format of all or a portion of the elements of interaction data within the received recordation request in accordance with the one or more centralized data formats and structures, and that generate corresponding elements of formatted interaction data (e.g., in step 518). Further, CA system 152 may perform one or more of the exemplary processes described herein to generate an additional ledger block of the permissioned distributed ledger that include the elements of formatted interaction data and a hash value representative of the elements of formatted interaction data (e.g., in step 520).

In step 522, CA system 152 may perform, in conjunction with other ones of CA systems 150, any of the exemplary consensus-based operations described herein to append the generated ledger block to a prior version of the permissioned distributed ledger, and to generate a latest, longest version of the permissioned distributed ledger, e.g., an updated permissioned distributed ledger. CA system 152 may further broadcast the updated permissioned distributed ledger, which represents the latest, longest version of the permissioned distributed ledger, to additional ones of CA systems 150 operating within environment 100 (e.g., in step 522), and may generate and transmit confirmation data indicative of the recordation of the elements of the formatted interaction data onto the updated permissioned distributed ledger to the participant system (e.g., in step 524). Exemplary process 500 is then complete in step 508.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including local permissioning engine 158, distributed permissioning engine 184, distributed interaction module 206, APIs 228, 304, 328, and 346, verification module 230, initiation module 232, management module 234, decryption module 236, comparison module 240, data consistency module 243, block generation module 248, distributed consensus module 258, distributed query module 306, centralized query module 336, and distributed response module 340, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination thereof.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network, such as network 120 of FIG. 1.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, a wearable computing device, or any of the additional or alternate computing devices described herein.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as for displaying information to the user (such as, but not limited to, an LED-based display device, an OLED-based display device, or a CRT (cathode ray tube) or LCD (liquid crystal display) monitor) and a keyboard and a pointing device (such as a mouse or a trackball) by which the user can provide input to the computer. In other instances, the functionalities of the display device, keyboard, and/or pointing device may be combined into a single interface device, such as a pressure-sensitive display unit. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus for secure management and provisioning of interaction data, comprising:
a communications interface;
a memory storing instructions; and
at least one processor coupled to the communications interface and to the memory, the at least one processor being configured to execute the instructions to:
receive query data from a first computing system via the communications interface, and access one or more ledger blocks of a distributed ledger, the one or more ledger blocks comprising encrypted permissioning data and interaction data;
decrypt the encrypted permissioning data and determine that a portion of the decrypted permissioning data includes a first identifier of the first computing system from which the query data was received, wherein the portion of the decrypted permissioning data characterizes an access permission associated with the query data received from the first computing system; and
transmit, via the communications interface, response data to the first computing system via the communications interface, the response data comprising a portion of the interaction data that is associated with the query data and that is consistent with the access permission.

2. The apparatus of claim 1, wherein:
the query data comprises the first identifier of the first computing system and a query term; and
the at least one processor is further configured to execute the instructions to determine that the portion of the interaction data is associated with the query term and is consistent with the access permission.

3. The apparatus of claim 2, wherein the at least one processor is further configured to obtain the interaction data from the one or more ledger blocks of the distributed ledger based on the determination that the portion of the decrypted permissioning data includes the first identifier.

4. The apparatus of claim 2, wherein:
the query term is generated by a device in communication with the first computing system; and
the response data comprises information that causes an application program executed at the first computing system to at least one of (i) present a representation of the portion of the interaction data within a digital interface or (ii) transmit the portion of the interaction data to the device.

5. The apparatus of claim 1, wherein:
the one or more ledger blocks of the distributed ledger comprise additional instructions executable by the at least one processor; and
the at least one processor is further configured to execute the instructions to:
determine that the query data includes a second identifier associated with the additional instructions; and
based on the determination that the query data includes the second identifier, execute the additional instructions and decrypt the encrypted permissioning data, obtain the portion of the decrypted permissioning data that includes the first identifier, and determine that the portion of the interaction data is associated with the query data and is consistent with the access permission.

6. The apparatus of claim 1, wherein:
the query data comprises a user identifier and an asset identifier; and
the at least one processor is further configured to execute the instructions to:
determine that the portion of the interaction data includes the first identifier and at least one of the user identifier or the asset identifier; and
generate the response data based on the determination that that the identified portion of the interaction data includes the first identifier and at least one of the user identifier or the asset identifier.

7. The apparatus of claim 1, wherein:
the portion of the decrypted permissioning data characterizes a plurality of access permissions associated with the first computing system; and
the at least one processor is configured to execute the instructions to determine that the portion of the interaction data is associated with the query data and is consistent with each of the plurality of access permissions.

8. The apparatus of claim 7, wherein the plurality of access permissions comprise (i) a first access permission granted to a class of computing systems that includes the first computing system and (ii) second access permission granted to the first computing system, the second access permission modifying the first access permission.

9. The apparatus of claim 1, wherein the at least one processor is further configured to execute the instructions to:
decrypt the encrypted permissioning data using a master cryptographic key of a centralized authority; and
based on the portion of the decrypted permissioning data, determine that the centralized authority grants the first computing system permission to access the interaction data.

10. The apparatus of claim 1, wherein the at least one processor is further configured to execute the instructions to receive, via the communications interface, a request to record additional interaction data onto the distributed ledger from a second computing system, the request comprising a second identifier of the second computing system.

11. The apparatus of claim 10, wherein the at least one processor is further configured to execute the instructions to:
determine that an additional portion of the decrypted permissioning data includes the second identifier, the additional portion of the decrypted permissioning data characterizing a recordation permission associated with the second computing system;
based on the additional portion of the decrypted permissioning data, determine that a centralized authority grants the second computing system permission to record the additional interaction data onto the distributed ledger;
generate an additional ledger block that includes the additional interaction data, and perform operations that record the additional ledger block onto the distributed ledger; and
transmit, via the communications interface, confirmation data to the second computing system, the confirmation data being indicative of the recordation of the additional ledger block onto the distributed ledger.

12. A computer-implemented method for secure ent and provisioning of interaction data, comprising:
using at least one processor, receiving query data from a first computing system, and accessing one or more ledger blocks of a distributed ledger, the one or more ledger blocks comprising encrypted permissioning data and interaction data;
using the at least one processor, decrypting the encrypted permissioning data and determining that a portion of the decrypted permissioning data includes a first identifier of the first computing system from which the query data was received, wherein the portion of the decrypted permissioning data characterizing an access permission associated with the query data received from the first computing system; and
transmitting, using the at least one processor, response data to the first computing system, the response data comprising a portion of the interaction data that is associated with the query data and that is consistent with the access permission.

13. The computer-implemented method of claim 12, wherein:
the query data comprises the first identifier of the first computing system and a query term; and
the computer-implemented method further comprises determining, using the at least one processor, that the portion of the interaction data is associated with the query term and is consistent with the access permission.

14. The computer-implemented method of claim 13, further comprises obtaining, using the at least one processor, the interaction data from the one or more ledger blocks of the distributed ledger based on the determination that the portion of the decrypted permissioning data includes the first identifier.

15. The computer-implemented method of claim 13, wherein:
the query term is generated by a device in communication with the first computing system; and
the response data comprises information that causes an application program executed at the first computing system to at least one of (i) present a representation of the portion of the interaction data within a digital interface or (ii) transmit the portion of the interaction data to the device.

16. The computer-implemented method of claim 12, wherein:
the query data comprises a user identifier and an asset identifier; and
the computer-implemented method further comprises:
determining, using the at least one processor, that the identified portion of the interaction data includes at least one of the user identifier or the asset identifier; and
generating, using the at least one processor, the response data based on the determination that that the identified portion of the interaction data includes at least one of the user identifier or the asset identifier.

17. The computer-implemented method of claim 12, wherein:
the portion of the decrypted permissioning data characterizes a plurality of access permissions associated with the first computing system; and
the computer-implemented method further comprises determining, using the at least one processor, that the portion of the interaction data is associated with the query data and consistent with each of the plurality of access permissions.

18. The computer-implemented method of claim 12, further comprising:
decrypting, using the at least one processor, the encrypted permissioning data using a master cryptographic key of a centralized authority; and
based on the portion of the decrypted permissioning data, determining, using the at least one processor, that the centralized authority grants the first computing system permission to access the interaction data.

19. The computer-implemented method of claim 12, further comprising:
receiving, using the at least one processor, a request to record additional interaction data onto the distributed ledger from a second computing system, the request comprising a second identifier of the second computing system;
determining, using the at least one processor, that an additional portion of the decrypted permissioning data includes the second identifier, the additional portion of the decrypted permissioning data characterizing a recordation permission associated with the second computing system;
based on the additional portion of the decrypted permissioning data, determining, using the at least one processor, that a centralized authority grants the second computing system permission to record the additional interaction data onto the distributed ledger;

generating, using the at least one processor, an additional ledger block that includes the additional interaction data, and performing operations, using the at least one processor, that record the additional ledger block onto the distributed ledger; and transmitting, using the at least one processor, confirmation data to the second computing system, the confirmation data being indicative of the recordation of the additional ledger block onto the distributed ledger.

20. A tangible, non-transitory computer-readable medium storing instructions that, when executed by at least one processor device, cause the at least one processor device to perform a method of secure management and provisioning of interaction data, comprising:

using receiving query data from a first computing system, and accessing one or more ledger blocks of a distributed ledger, the one or more ledger blocks comprising encrypted permissioning data and interaction data;

decrypting the encrypted permissioning data and determining that a portion of the decrypted permissioning data includes a first identifier of the first computing system from which the query data was received, wherein the portion of the decrypted permissioning data characterizes an access permission associated with the query data received from the first computing system; and transmitting response data to the first computing system, the response data comprising a portion of the interaction data that is associated with the query data and that is consistent with the access permission.

* * * * *